United States Patent
Samuel et al.

(10) Patent No.: US 11,789,722 B2
(45) Date of Patent: *Oct. 17, 2023

(54) CROSS-PUBLISHING SOFTWARE LIBRARIES TO MODULE REPOSITORIES

(71) Applicant: Temper Systems, Inc., Dover, DE (US)

(72) Inventors: Michael Vincent Samuel, Princeton, NJ (US); Jasvir Nagra, Redwood City, CA (US)

(73) Assignee: Temper Systems, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,461

(22) Filed: Nov. 1, 2021

(65) Prior Publication Data

US 2022/0206787 A1    Jun. 30, 2022

Related U.S. Application Data

(63) Continuation of application No. 17/135,626, filed on Dec. 28, 2020, now Pat. No. 11,163,559.

(51) Int. Cl.
   *G06F 8/71*    (2018.01)
   *G06F 8/10*    (2018.01)
   *G06F 8/36*    (2018.01)

(52) U.S. Cl.
   CPC ............ *G06F 8/71* (2013.01); *G06F 8/10* (2013.01); *G06F 8/36* (2013.01)

(58) Field of Classification Search
   None
   See application file for complete search history.

(56) References Cited

U.S. PATENT DOCUMENTS

| | | | | |
|---|---|---|---|---|
| 6,742,175 | B1* | 5/2004 | Brassard | G06F 8/71 717/107 |
| 8,510,762 | B1* | 8/2013 | Gregorio | G06F 8/36 717/106 |
| 2010/0037213 | A1* | 2/2010 | Meijer | G06F 8/427 717/144 |
| 2013/0042258 | A1* | 2/2013 | Rector | G06F 8/51 719/328 |
| 2014/0278623 | A1* | 9/2014 | Martinez | G06Q 10/06 705/7.12 |
| 2015/0199534 | A1* | 7/2015 | Francis | G06F 21/78 726/28 |
| 2016/0048606 | A1* | 2/2016 | Rubinstein | H04N 21/8355 715/234 |
| 2016/0140036 | A1* | 5/2016 | O'Meara | G06F 9/5022 711/166 |

OTHER PUBLICATIONS

Gardle, "Publishing a project as module", 2020, gradle.org (Year: 2020).*

(Continued)

*Primary Examiner* — Hossain M Morshed
(74) *Attorney, Agent, or Firm* — NICHOLSON DE VOS WEBSTER & ELLIOTT LLP

(57) ABSTRACT

Embodiments provide computer-implemented techniques for publishing multiple software libraries to multiple source code repositories using a set of repository agents each configured to execute one or more source code repository-specific pre-publication actions for different source code repositories.

20 Claims, 10 Drawing Sheets

(56) References Cited

OTHER PUBLICATIONS

Gradle, "Publishing a project as module, Version 6.7.1", 2020, Published by Gradle (Year: 2020).*
Howto, "Program Library Howto: shared libraries", 2002, published at https://tldp.org/HOWTO/Program-Library-HOWTO/shared-libraries.html (Year: 2003).*
Altassian, "How to choose the best source code repository", 2020, Published by Altassian (Year: 2020).*
Sucharevich, Olga, "How to Automate the Publishing Process of NPM Modules Using Codefresh", https://codefresh.io/containers/automate-publish-npm-modules/, dated Mar. 16, 2017, 13 pages.
Howto, "Program Library Howto: Shared Libraries", Version 1.20, https://tldp.org/HOWTO/Program-Library-HOWTO/shared-libraries.html, Apr. 11, 2003, 8 pages.
Gradle.org, "Publishing a Project as Module", Version 6.7.1, https://docs.gradle.org/current/userguide/publishing_setup.html#sec:basi . . . , last viewed on Nov. 23, 2020, 8 pages.
Gradle, "Publishing a Project as Module", Version 6. 7.1, https://docs.gradle.org/current/userguide/publishing_setup.html, Nov. 28, 2020, 8 pages.
Altassian, "How to Choose the Best Source Code Repository", https://bitbucket.org/product/code-repository, Sep. 30, 2020, 11 Pages.
Samuel, U.S. Appl. No. 17/135,626, filed Dec. 28, 2020, Office Action, dated Mar. 16, 2021.
Samuel, U.S. Appl. No. 17/135,626, filed Dec. 28, 2020, Notice of Allowance, dated Jun. 30, 2021.
International Search Report and Written Opinion, PCT App. No. PCT/US2021/065235, dated Apr. 7, 2022, 14 pages.
Non-Final Office Action, U.S. Appl. No. 17/135,626, dated Mar. 16, 2021, 15 pages.
Notice of Allowance, U.S. Appl. No. 17/135,626, dated Jun. 30, 2021, 11 pages.
Velíšek, Bc. Ondrej, "OpenID Connect Based Authentication for Host Remote Access", Master's Thesis, Masaryk University, Faculty of Informatics, Fall 2018, 98 pages.

* cited by examiner

CROSS-PUBLISHING SOFTWARE LIBRARIES TO MODULE REPOSITORIES

BENEFIT CLAIM

This application claims the benefit as a continuation of application Ser. No. 17/135,626, filed Dec. 28, 2020, the entire contents of which is hereby incorporated by reference. The applicant hereby rescinds any disclaimer of claim scope in the parent applications or the prosecution history thereof and advise the USPTO that the claims in this application may be broader than any claim in the parent application.

TECHNICAL FIELD

The present disclosure relates to software module repositories. More specifically, the present disclosure relates to computer-implemented techniques for publishing multiple different software libraries that have been generated from a common specification to multiple different module repositories.

BACKGROUND

Computers are very powerful tools for performing a wide variety of tasks. Computer programs (software) are a common mechanism for accomplishing custom processing tasks using computer systems. A typical computer program is a set of programmed instructions (source code) that is created by one or more software developers. During the process of creating software to accomplish a specific processing task, software developers often delegate sub-tasks of the larger processing task to software libraries.

Software developers can make libraries available for sharing and re-use by uploading the libraries to module repositories that are stored on a network, such as the Internet. Another software developer working on a different processing task can search the module repository, download a copy of a software library from the module repository, and store the copy of the software library locally. A downloaded copy of the software library may be stored on the same computer that will run the program that uses the library in the course of performing the larger processing task.

A software library may be produced by a compiler that compiles source code written in a particular programming language into an executable form. The executable form produced by the compiler may be specifically configured to run in a particular computing environment, such as a specific operating system platform. To generate executables of the software library to be used by different computing platforms, a cross-compiler may be used.

A cross-compiler can accept source code that is both human and computer-readable as input and produce multiple different executable forms of the source code as outputs. For instance, a cross-compiler for the C programming language might produce from C source code an x86 executable (e.g., for execution on computers configured with the MICROSOFT WINDOWS operating system), an ARM executable (e.g., for execution on mobile computing devices configured with the ANDROID operating system), and a WASM executable (e.g., for execution on a virtual stack machine supported by a web browser application).

To make the software library source code available in different programming languages, a source-to-source compiler may be used. A source-to-source compiler accepts source code that is both human and computer-readable as input. The source-to-source compiler outputs source code for one or more source code targets that are also each both human and computer readable. For example, the HAXE compiler can translate source code written in the HAXE programming language into a handful of structurally similar programming language targets. More information on HAXE is available on the Internet in the haxe.org Internet domain.

The process of sharing a software library to a module repository may be referred to as "publishing" the library.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The techniques are illustrated by way of example, and not by way of limitation, in the figures of the accompanying drawings and in which like reference numerals refers to similar elements and in which.

SUMMARY

Figure 1:
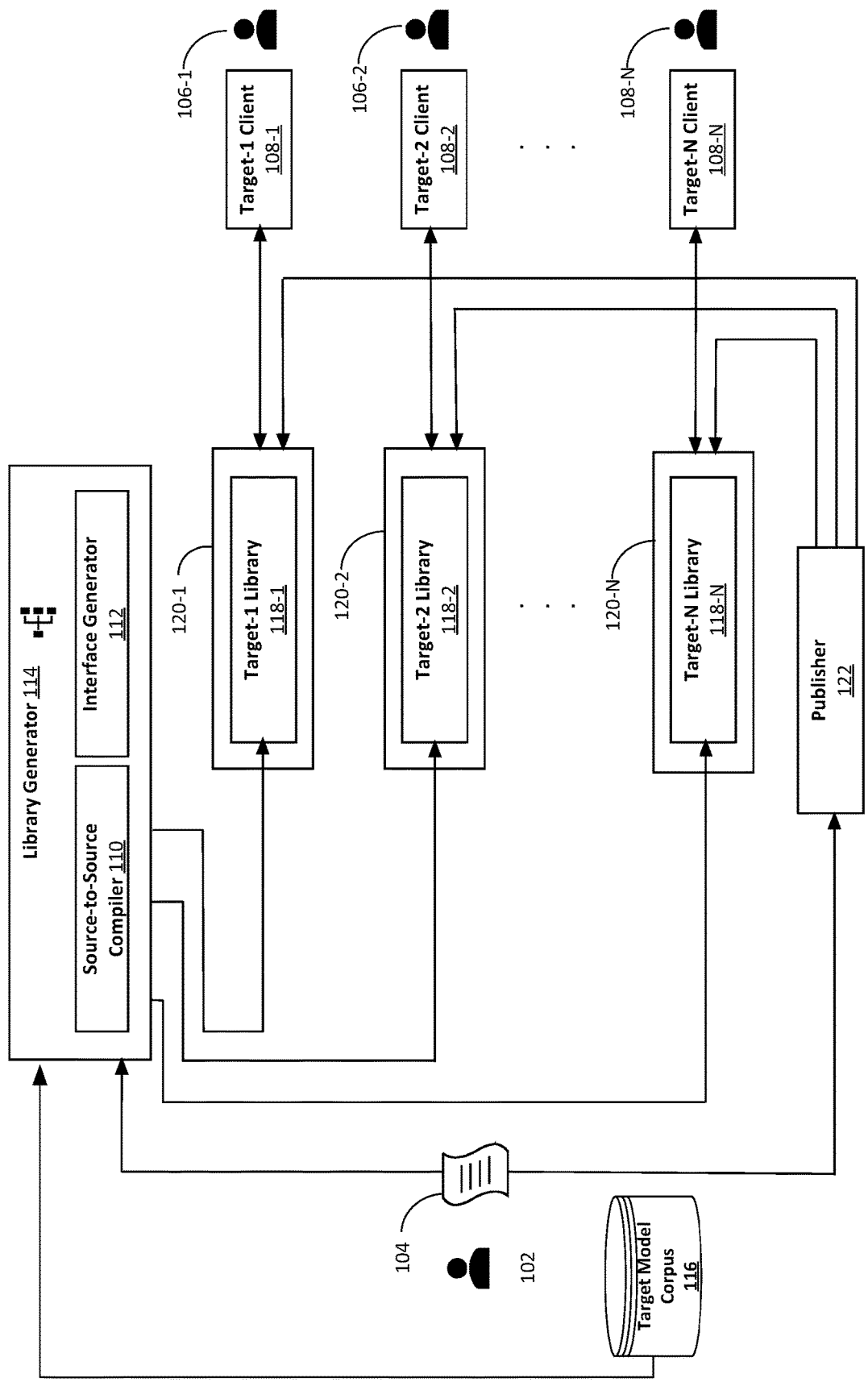
FIG. 1 depicts an organizational view of publishing many software libraries generated from a common specification to many repositories.

The General Overview section of the Detailed Description below provides a useful overview of the techniques for cross-publishing software libraries to module repositories.

DETAILED DESCRIPTION

In the following description, for the purposes of explanation, numerous specific details are set forth in order to provide a thorough understanding of the techniques. It will be apparent, however, that the techniques may be practiced without these specific details. In other instances, well-known structures and devices are shown in block diagram form in order to avoid unnecessarily obscuring the techniques.

General Overview

When a software library is cross-compiled to multiple different target programming languages, a version of the library is produced in each of the target programming languages. Module repositories may be organized by target. For example, different programming language communities may use different Internet-based repositories to share their software libraries. Thus, the process of publishing a software library that has been compiled for multiple different targets may involve publishing multiple versions of the software library to multiple different module repositories.

A repository often provides its own tools, processes, and workflows for performing tasks associated with the publishing of a library to the repository. Examples of such tasks include grouping compiler outputs, compiler inputs, documentation, and metadata files into archive files and sending the archive files over a network to machines working on behalf of the repository.

Each different repository may have its own file naming and versioning conventions. Library dependencies may be handled differently by different repositories. Different repositories may have different quality control and authentication requirements or perform quality control checks or authentication at different stages of the publication process. A particular repository's tools may group the files to be published in a manner that is specific to the repository.

As a result of these and other repository-specific idiosyncrasies, publishing to different repositories demands understanding and use of multiple different repository-specific tools, processes, and workflows. Consequently, publishing groups of related software libraries, such as cross-compiled software libraries, can be laborious and time-consuming. The risk of errors may be increased due to problems reconciling naming conventions and/or version numbers across libraries and repositories, or by the inadvertent failure to propagate module dependencies across libraries and repositories. Increased exposure to security breaches may occur if authentication credentials are improperly entered or shared, or if authorization to publish is not verified at appropriate times.

Computer-implemented techniques are described herein for cross-publishing software libraries to module repositories. The techniques disclosed herein simplify the process of publishing groups of related software libraries, such as software libraries that have all been generated from a common specification and which may be individually suitable for different targets, to different module repositories.

In an embodiment, the disclosed technologies perform operations including, for each of a group of multiple different software libraries that each have been generated from a common specification using a different computer programming language, mapping the software library to a module repository of a group of multiple different module repositories via a repository agent of a group of multiple different repository agents. The repository agent is applied to the software library to execute at least one pre-publication action. In response to determining that all of the repository agents have completed execution of their respective pre-publication actions, the software libraries in the group of multiple different software libraries generated from the common specification are published to their respective module repositories in the group of multiple different module repositories.

These and other aspects of the techniques will become apparent from the following detailed description in combination with the accompanying drawings, illustrating, by way of example, the principles of the techniques.

GLOSSARY

The following definitions are provided for illustrative purposes, not limitation, to aid in understanding of the disclosure of the techniques:

Client: A "client" may refer to part of a system that accesses a module repository for the purpose of uploading or downloading a library from the module repository. In other contexts, client may be used to refer to a part of a system that delegates a task to a library.

Common Specification: A "common specification" is an input suitable for two or more compilers, or one or more cross-compilers.

Compiler: A "compiler" consumes an input suitable for both human and machine consumption, such as a program written in a programming language, and produces an output more suitable for machine consumption.

Cross-Compiler: A "cross-compiler" is a compiler that produces two or more outputs from one input.

Cryptographically Strong: "Cryptographically strong" refers to a property of a producer of sequences of bits and of the sequences it produces, which is that knowing some sequences produced does not help an outside observer predict subsequently produced sequences or reverse engineer the inputs from which they were produced. For example, both a truly random number generator and a strong encryption algorithm in which the encrypted bit sequence bears no discernible relationship to the plain text input unless one knows the key may be considered cryptographically strong.

Dependency metadata: "Dependency metadata" conveys requirements of the form "this version of this library needs version x of library y" and are used to make sure that when a library is downloaded from a repository, its dependencies and their dependencies transitively are also downloaded so that the library and all dependencies will be available when the program that uses them is run.

Feature: A "feature" may encompass one or more lexical tokens extracted from a common specification that semantically relates to a software library, a module repository, or a target. Examples of features include but are not limited to file names, file system path names, metadata, revision control tags or labels, date/timestamps (which may indicate, for example, that a particular version of a library corresponds to a particular commit to a particular module repository or to a particular branch of a particular module repository), a result of applying a hash function (where the hash may be a cryptographically strong hash or a GIT object hash, for example).

Functional Element: A "functional element" may be defined as a portion of a compiler output that programmers maintaining a compiler input would like to allow a client to use.

Library: A "library" may be defined as the expression of an algorithm or algorithms in an automatable form. An example of an automatable form may be programming language source code or a compiled version thereof (e.g., as bytecode, binary-executable code, etc.). Typically, when executed as a process or processes, the library does not "own" the process(es) of which it executes as a part of. Instead, a library executes alongside or as part of a larger system that delegates specific kinds of algorithmic tasks to the library. For example, a microservice on a computer network may be viewed as a library. Microservices often exist for other network nodes to delegate specific algorithmic tasks to.

Mapping: "Mapping" may be used herein to refer to a data relationship or a process of creating a data relationship. Examples of mechanisms that may be used to perform mapping or create and maintain mappings include graphs, ontologies, and databases.

Module: A "module" may refer to a functional element, a group of functional elements, an implementation, an interface, or a library.

Module repository: A "module repository" may refer to a network-accessible store of libraries retrievable by name/version suitable for a particular target that makes software libraries available to developers. Different targets use different module repositories with different tools, processes, conventions, and workflows for naming and publishing libraries and for publishing new versions of existing libraries.

Name/identifier: "Name" or "identifier" may refer to a term which may appear in a compiler input and/or output. Clients may use that same name/identifier or one derived via mechanical rules to reference modules so named/identified.

Publication: "Publication" may refer to the process of adding a version of a library to a module repository.

Project: A "project" uses a cross-compiler or other mechanism to produce libraries from a common specification and may use the disclosed technologies to publish each library to the module repository or repositories used by its target's clients.

System: "System" may refer to one or more collaborating computer programs.

Target: A "target" may be defined as a mechanism used by a client to connect to a compiler output. A programming language can be a target; a programmer writes code to connect to a library that loads into the same memory space. A virtual machine (VM) can be a target; a programmer can write code that compiles to the kind of byte-code that the virtual machine runs and rely on the VM to link uses via the interface. Other potential targets include but are not limited to FTP (file transfer protocol) sites and application servers. Another program may be a client. Accordingly, inter-program mechanisms are targets; code may use inter-process communication (IPC), remote procedure calling (RPC), or RESTful network protocols to send a message to something running outside the client program's process such as, for example, a network service or a microservice, and recognize when an incoming message contains a response.

Type: A "type" is a definitional element that serves to explain which kinds of values fit where. For example, a definitional element may use a numeric type in one way to indicate that it expects a number (numeric value) as input and in another to indicate that it produces a number as output.

Version: "Version" may refer to a label applied to related compiler inputs, outputs, and libraries at a point in time. Often, versions of the same thing are ordered; looking at the text of the label is sufficient to say which is "later" though that does not mean that the later was applied at a later time.

Example Use Case

Consider, for example, a use case of the techniques in a large software-development organization that has many specialized teams of engineers and scientists. For example, the organization may have a mobile application development team of engineers, a web application development team, and a data science team. Each of these teams may use different programming languages and related technologies. And across all teams, many different programming languages may be used (e.g., eight or more). Inevitably, each of these teams will have common problems that need to be solved. A common problem may be related to business requirements that do not pertain to or require any particular programming language or technology.

One possible organizational approach to solving organization-wide problems is to have each team separately solve the problem using the programming languages and technologies that they respectively are most comfortable with. In addition to duplicated efforts, this approach has other issues. For one, due to the siloed nature of the teams and the respective different programming languages and technologies each team uses, the possibility for code sharing across teams is limited to nonexistent. Further, if each team silo separately translates the business requirements of the common problem, then the result can be multiple low-quality, subtly different, and inconsistently maintained solutions.

In contrast, a common infrastructure team using the techniques disclosed herein can develop a solution for all other teams including providing the solution in the respective programming languages that the teams are experienced and familiar with. In particular, members of the common infrastructure team can author a source code specification embodying a solution to the common problem in a single source computer programming language. Thus, the members need only be experts in the source computer programming language and do not need to be experts in many computer programming languages.

At a high level, once the common source code specification has been authored, a library generator produces a software library for each target. The library generator includes an interface generator and a source-to-source compiler. Examples of an interface generator and a source-to-source compiler are described in more detail in U.S. patent application Ser. No. 17/131,574, entitled "Deriving Many Idiomatic Programming Language Interfaces," filed Dec. 22, 2020, incorporated herein by this reference.

While use cases are described in which programming languages are the targets, the techniques are not limited to programming language targets. More broadly, a target may be defined as a mechanism used to connect to a compiler output (e.g., a target implementation of a target library). With this broader view, a virtual machine (VM) or an inter-process communication (IPC) mechanism can be a target.

Also, use cases are described in which software libraries are created from a common specification. However, the techniques are not limited to cross-compiling scenarios. More broadly, the techniques can be used to cross-publish a group of software libraries that are related in some other way, such as by author, owner, or license type. In those other scenarios, the group of software libraries to be published may be identified by user input, such as search criteria or selections on a graphical user interface.

As described in more detail below, the disclosed techniques utilize a corpus of repository agents and coordinate actions of those repository agents to publish groups of related libraries to appropriate module repositories. Once published, the target libraries are available for use by other software developers such as other teams within the same the organization or different organizations.

Beneficially, the problems associated with the need to use multiple different repository-specific tools, processes and workflows to publish related libraries to multiple different repositories can be solved through the configuration and coordination of repository agents provided by the disclosed techniques.

Example System

FIG. 1 depicts an organizational use case of publishing many software libraries to many module repositories. The common infra-structure team cross-compiling example is discussed throughout herein. However, numerous other use cases of the techniques are possible. For example, a software developer or programmer in a community of developers or programmers can develop a solution in the source programming language and then use the techniques to create versions of the solution in many different programming languages, which the developer can then publish to various online source code repositories such as GITHUB, BITBUCKET, GITLAB, SOURCEFORGE, or the like. The disclosed techniques are applicable whether the solutions are published to a common-infrastructure repository or to an online, e.g., Internet-based, repository.

Returning to the organizational use case, at the outset, a human programmer 102 in a common infra-structure team programs (authors) a common specification 104 in a source programming language. Common specification 104 is suitable for input to both source-to-source compiler 110 and interface generator 112 of library generator 114. Common specification 104 defines an implementation of an algorithm that provides a solution to a shared organizational problem and also declares an interface therefore according to the source programming language and in a form that is both human and computer readable. While in some implementations source-to-source compiler 110 is a separate and distinct component from interface generator 112, in other implementations source-to-source compiler 110 and interface generator 112 are integrated in the same component. In either case, source-to-source compiler 110 and interface generator 112 may be referred to collectively as library generator 114, for ease of discussion.

Once programmed, common specification 104 is translated (compiled) by source-to-source compiler 110 into many target implementations (not shown) of the algorithm in many different target programming languages. For example, the target programming languages may encompass widely used languages such as, for example, all the following programming languages, a subset of these languages, or a superset thereof: C, JAVA, PYTHON, C++, C #, JAVASCRIPT, PHP, SWIFT, R, LISP, FORTRAN, ADA, PASCAL, GROOVY, RUBY, GO, OBJECTIVE-C, DART, SCALA, and LUA.

Common specification 104 is also translated (compiled) by interface generator 112 into many target interfaces (not shown) using target model corpus 116. Target model corpus 116 contains an interlinguistic definitional element model for each target language, as described in U.S. patent application Ser. No. 17/131,574.

A target interface and target implementation pair when connected together form a target library in a target programming language that is available for use by a target client. In the example of FIG. 1, target library 118-1 is composed of a first interface connected with a first implementation for a first target programming language, target library 118-2 is composed of a second interface connected with a second implementation for a second target programming language, . . . target library 118-N is composed of an Nth interface connected with an Nth implementation for an Nth target programming language, where N is a positive integer. For example, target library 118-N may be a JAVA source code library, target library 118-2 may be a PYTHON source code library, . . . target library 118-N may be a C++ source code library.

A target library 118-1, 118-2, . . . 118-N typically is accompanied by one or more additional files, such as library metadata files, which may identify a particular repository to which the target library is to be published, file system path names of library files and related files, and documentation that needs to be published to the repository along with the target library, such as README files. Collectively, a target library 118-1, 118-2, . . . 118-N and its associated files may be referred to as a "data bundle" for the library. Alternatively, where library generator 114 has generated a group of related libraries 118-1, 118-2, . . . 118-N from a common specification, "data bundle" may refer to the group of related libraries and the associated files for all of the libraries in the group.

Publisher 122 publishes target libraries 118-1, 118-2, . . . 118-N to respective target repositories 120-1, 120-2, . . . 120-N using the techniques disclosed herein. Target clients 108-1, 108-2, . . . 108-N can respectively connect to the target repositories 120-1, 120-2, . . . 120-N to search for and download target libraries 118-1, 118-2, . . . 118-N.

Once downloaded from target repositories 120-1, 120-2, . . . 120-N for use in a particular project, target libraries 118-1, 118-2, . . . 118-3, client computer programs may connect to target libraries 118-1, 118-2, . . . 118-3 via APIs, or by target libraries 1118-1, 118-2 . . . 118-3 executing as network services or micro-services via a network remote procedure call (RPC) protocol or the like such as, for example, Representational State Transfer (REST), SOAP, XML-RPC, JSON-RPC, or the like.

Human programmers 106-1, 106-2, . . . and 106-N may each be on different software project teams using different programming languages. For example, programmer 106-1 may be on the organization's enterprise software team that programs target-1 client 108-1 in the JAVA programming language. Continuing the example, programmer 106-2 may be on the organization's data science team that programs target-2 client 108-2 in the PYTHON programming language, and programmer 106-N may be on the organization's embedded systems team that programs target-N client 108-N in the C++ programming language.

Although target libraries 118-1, 118-2, . . . 118-N have been generated from a common specification, they may be used to accomplish completely different tasks. For example, programmer 106-1 may use target library 118-1 to accomplish an enterprise software task, programmer 106-2 may use target library 118-2 to accomplish a data science task, and programmer 106-N may use target library 118-N to accomplish an embedded systems task. Nonetheless, these different tasks may require common functionality provided by target libraries 118-1, 118-2, . . . 118-N in different programming languages. For example, the common functionality may be dictated by business requirements of the organization such as for information security or privacy compliance, or simply base functionality that many target clients require.

The source programming language used to create the common specification may be a general-purpose language supporting various programming language constructs. To support source-to-source compilation for many target programming languages, the source programming language may have various characteristics that support flexibility of source-to-source compiler 110 and interface generator 112 to translate common specification 104 in source programming language to many different target programming languages and to accommodate various differences that exist across widely used target programming languages.

Publishing to the Target Repositories

Figure 2:
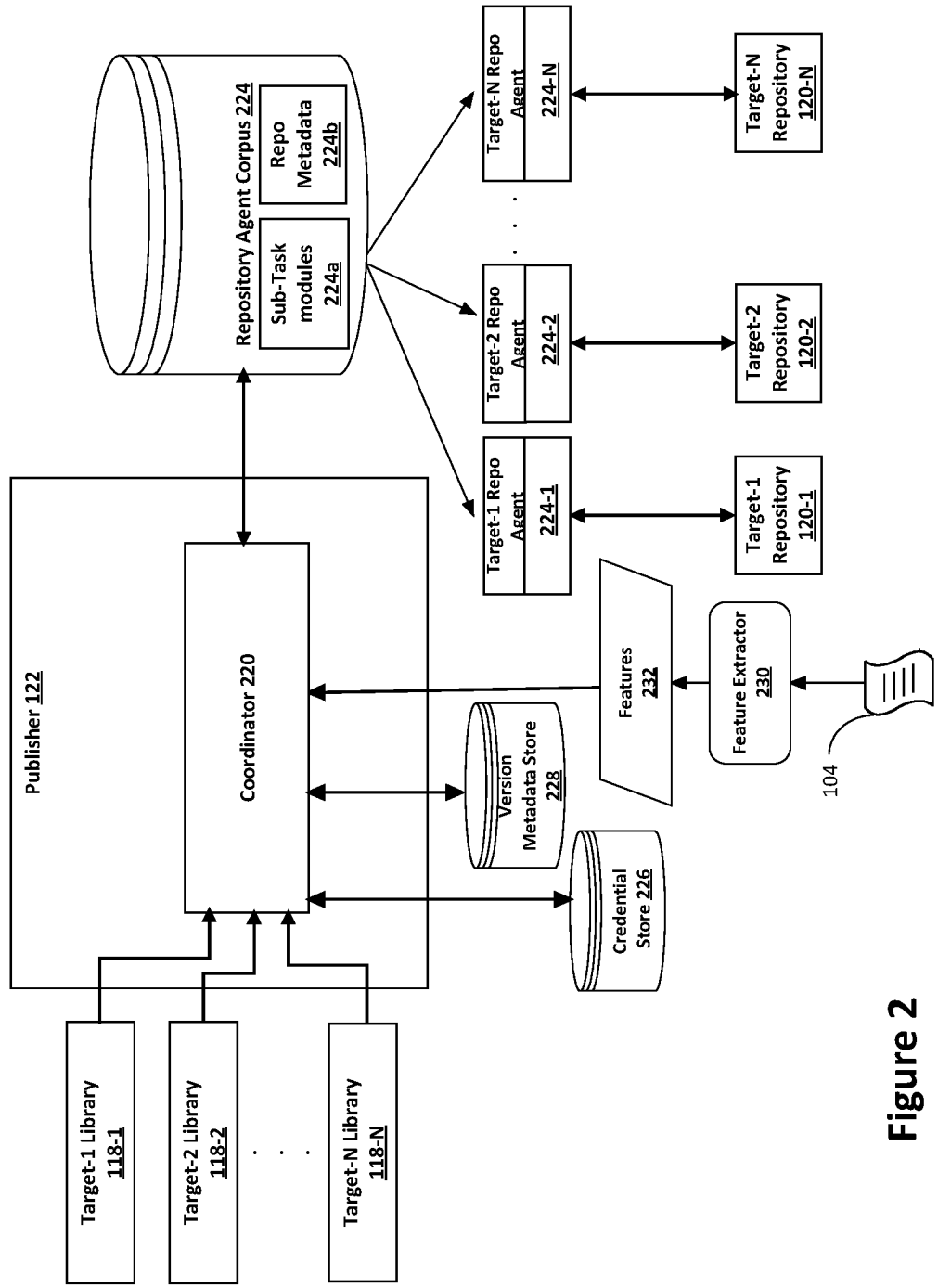
FIG. 2 is a block diagram of a publisher for publishing multiple software libraries to multiple repositories.

FIG. 2 is a block diagram of publisher 122. Publisher 122 includes coordinator 220 that maps target libraries 118-1, 118-2, . . . 118-N to repositories 120-1, 120-2, . . . 120-N via repository agents 224-1, 224-2, . . . 224-N and coordinates pre-publication actions of repository agents 224-1, 224-2, . . . 224-N. Operations of publisher 122 may be initiated by a human publication manager or by a signal containing a communication from another module or system, such as a continuous integration (CI) system, that includes an indication that the common specification is suitable for publishing.

Repository agents 224-1, 224-2, . . . 224-N are part of a repository agent corpus 224. Repository agent corpus 224 includes sub-task modules 224a and repository ("repo") metadata 224b. A sub-task module 224a is composed of one or more computer programs that when executed by one or more processors cause a repository agent 224-1, 224-2, . . . 224-N to perform its respective sub-tasks using its respective repo metadata 224b. A repo metadata store 224b stores repository-specific metadata such as file naming conventions, versioning conventions, dependency metadata, and authentication rules, for a particular repository 120-1, 120-2, . . . 120-N. Sub-task modules 224a may include modules that implement pre-publication tasks for a particular repository as well as publication tasks and post-publication tasks for the repository. Thus, while coordinator 220 coordinates pre-publication actions of repository agents 224-1, 224-2, . . . 224-N, repository agents 224-1, 224-2, . . . 224-N are not limited to performing pre-publication actions but may perform publication actions and post-publication actions, as well.

In the example of FIG. 2, each repository 120-1, 120-2, . . . 120-N accepts and stores libraries for a different target. For example, target-1 repository 120-1 accepts and stores libraries for a target-1 programming language, target-2 repository 120-2 accepts and stores libraries for a target-2 programming language, and target-N repository 120-N accepts and stores libraries for a target-N programming language.

Each repository agent 224-1, 224-2, . . . 224-N is composed of a set of sub-task modules 224a and a set of repo metadata 224b that each have been configured for one or more particular repositories 120-1, 120-2, . . . 120-N. For example, target-1 repo agent 224-1 is composed of a set of sub-task modules 224a and a set of repo metadata 224b that collectively implement the conventions, processes and workflows for publishing software libraries to target-1 repository 120-1, target-2 repo agent 224-2 is composed of a set of sub-task modules 224a and a set of repo metadata 224b that collectively implement the conventions, processes and workflows for publishing software libraries to target-2 repository 120-2, and target-N repo agent 224-N is composed of a set of sub-task modules 224a and a set of repo metadata 224b that collectively implement the conventions, processes and workflows for publishing libraries to target-N repository 120-N. For ease of discussion, examples are described in which each repository agent performs tasks for a different repository. However, any repository agent may perform tasks for multiple different repositories.

Coordinator 220 determines which repository 120-1, 120-2, . . . 120-N to which a library 118-1, 118-2, 118-N is to be published by obtaining and reading library metadata from the library's data bundle. For example, coordinator 220 may read metadata in the library's data bundle that identifies the repository 120-1, 120-2, . . . 120-N to which the library 118-1, 118-2, 118-N is to be published. Alternatively, coordinator 220 may read one or more features from the library's data bundle and apply a rule to the features in order to determine the repository 120-1, 120-2, . . . 120-N to which the library 118-1, 118-2, 118-N is to be published. Examples of features that coordinator 220 may use to determine the repository 120-1, 120-2, . . . 120-N to which the library 118-1, 118-2, 118-N is to be published include the name or file system path of the library's data bundle and metadata files within the library's data bundle.

Once coordinator 220 has identified a repository 120-1, 120-2, . . . 120-N to which a library 118-1, 118-2, 118-N is to be published, coordinator 220 determines which repository agent 224-1, 224-2, . . . 224-N is to perform actions for the library 118-1, 118-2, 118-N-repository 120-1, 120-2, . . . 120-N pair. To do this, coordinator 220 reads repo metadata 224b that matches repository agents 224-1, 224-2, . . . 224-N with repositories 120-1, 120-2, . . . 120-N. For example, repo meta data 224b may include, for a repository agent 224-1, 224-2, . . . 224-N, a human- and computer-readable description of the module repository or repositories to which repository agent 224-1, 224-2, . . . 224-N can publish.

Alternatively, coordinator 220 sends the data bundle for the library 118-1, 118-2, 118-N to one or more repository agents 224-1, 224-2, . . . 224-N, and repository agents 224-1, 224-2, . . . 224-N execute one or more rules implemented in sub-task modules 224a to inspect the data bundle and determine whether the data bundle is suitable for any of repository agents 224-1, 224-2, . . . 224-N to handle.

Once it has been determined, either by coordinator 220 or by a repository agent 224-1, 224-2, . . . 224-N, that repository agent 224-1, 224-2, . . . 224-N can perform sub-tasks 224a for a particular library 118-1, 118-2, 118-N, repository agent 224-1, 224-2, . . . 224-N performs the requisite sub-tasks for the particular library 118-1, 118-2, 118-N. Examples of sub-tasks that a repository agent 224-1, 224-2, . . . 224-N may perform include diagnostics, repository configuration, library grouping, name reserving, credential communications, quality control tasks and communications, uploading files, performing commit steps, applying revision control labels or tags to files, and updating version metadata.

An example of a diagnostic task is providing a human-readable and machine-readable description of the module repository or repositories to which the repository agent can publish. An example of a configuration task is creating a variant agent which can publish to a repository at a non-standard or secondary location. For instance, instead of publishing to a default repository, the variant agent may publish to a repository used only by authorized developers for testing pre-release versions.

An example of a credentialing task is accepting a set of credentials for one or more subsequent actions that require proof of authorization to perform the subsequent actions. An example of a library grouping task is determining whether a library, represented as a compiler output or bundle of compiler outputs, is suitable for the module repository. Examples of name reserving tasks are described below with reference to FIG. 3A and FIG. 3B.

Once publisher 122 has mapped a library 118-1, 118-2, 118-N to a repository 120-1, 120-2, . . . 120-N for which a repository agent 224-1, 224-2, . . . 224-N has been configured, the repository agent 224-1, 224-2, . . . 224-N for the repository may assemble the library's data bundle by collecting files, metadata, and credentials that are needed to publish the library 118-1, 118-2, 118-N to the repository 120-1, 120-2, . . . 120-N. In doing so, repository agent 224-1, 224-2, . . . 224-N compares repo metadata 224b to the collected files, metadata and credentials to determine whether any file or data required for publication to the repository is missing.

If repository agent 224-1, 224-2, . . . 224-N determines that a required file or data is missing, repository agent 224-1, 224-2, . . . 224-N generates a signal, such as a human-readable communication, which may be conveyed to a human publication manager via a graphical user interface of publisher 122. For example, if repository agent 224-1, 224-2, . . . 224-N determines that a library file is missing a version tag, repository agent 224-1, 224-2, . . . 224-N may send a communication to publisher 122 that causes publisher 122 to display a prompt on a graphical user interface for a version tag. As another example, if repository agent 224-1, 224-2, . . . 224-N determines that a security credential is needed to perform a particular sub-task, repository agent 224-1, 224-2, . . . 224-N may send a communication to publisher 122 that causes publisher 122 to display a prompt on a graphical user interface for the publication manager to input a credential. The human publication manager 102 may be, for example, programmer 102.

A repository agent 224-1, 224-2, . . . 224-N may exchange signals, such as machine-readable communications, with a repository 120-1, 120-2, . . . 120-N for which the repository agent 224-1, 224-2, . . . 224-N has been configured. For example, a repository agent 224-1, 224-2, . . . 224-N may communicate with a module repository 120-1, 120-2, . . . 120-N to upload files related to a new version of a library 118-1, 118-2, 118-N. After repository agent 224-1, 224-2, . . . 224-N completes execution of a sub-task, repository agent 224-1, 224-2, . . . 224-N may communicate a signal, which may contain a human-readable success message or failure message, to the human publication manager via a graphical user interface of publisher 122.

If repo metadata 224b for a module repository 120-1, 120-2, . . . 120-N indicates that the module repository 120-1, 120-2, . . . 120-N requires internal quality control checks for uploaded files and/or a commit step separate from the upload, repository agent 224-1, 224-2, . . . 224-N pauses execution of a sub-task until repository agent 224-1, 224-2, . . . 224-N receives a signal, such as a machine-readable communication, from repository 120-1, 120-2, . . . 120-N indicating that the quality checks required by repository 120-1, 120-2, . . . 120-N have been completed. Repository agent 224-1, 224-2, . . . 224-N may either automatically commit or commit in response to a communication from repository 120-1, 120-2, . . . 120-N. Alternatively, repository agent 224-1, 224-2, . . . 224-N may send a signal, such as a human-readable communication, via a graphical user interface of publisher 122, informing a human publication manager that the publication to the module repository 120-1, 120-2, . . . 120-N is ready for final approval.

After a successful commit, repository agent 224-1, 224-2, . . . 224-N may update or commit version data changes to version metadata store 228 to relate the version of the common specification from which the newly published library was generated to the newly published version of the library. In some implementations, repository agent 224-1, 224-2, . . . 224-N may apply revision control labels or tags to repository 120-1, 120-2, . . . 120-N to indicate that the publication was successful.

In some implementations, repository agent 224-1, 224-2, . . . 224-N may perform the tasks usually performed by source to source compiler 110 and interface generator 112. That is, rather than executing sub-task modules 224a for a library 118-1, 118-2, 118-N that already has been generated by library generator 114, repository agent 224-1, 224-2, . . . 224-N may build a particular library that is suitable for its module repositories 120-1, 120-2, . . . 120-N, from common specification 104 and repo metadata 224b. To do this, repository agent 224-1, 224-2, . . . 224-N may read repo metadata 224b and invoke feature extractor 230 to extract features 232 from common specification 104 that are indicated by repo metadata 224b as needed for the agent's repositories.

Repository agent 224-1, 224-2, . . . 224-N may also call source-to-source compiler 110 to generate functional elements from common specification 104 and may call interface generator 112 to generate the target interface for a given target language given features 232, repo metadata 224b, and a target model of target model corpus 116 for the target language. For example, interface generator 112 may generate interlinguistic definitional elements from features 232 and then translate the generated interlinguistic definitional elements into idiomatic interface definitions for the target language and repository using a target model and repo metadata 224b. Repository agent 224-1, 224-2, . . . 224-N may then combine the idiomatic interface definitions with the functional elements generated by source-to-source compiler 110 to build the library that is suitable for its module repositories 120-1, 120-2, . . . 120-N.

Credential Store

Credential store 226 is a searchable data store that stores authorization credential data. Credential store 226 may be implemented using, for example, a commercial off-the-shelf key-store, password manager, or an abstraction that combines a key-store and a password manager. Coordinator 220 accesses and reads data from credential store 226 at various times during the process of publishing libraries 118-1, 118-2, 118-N to repositories 120-1, 120-2, . . . 120-N to obtain security credentials from credential store 226 and provides credentials to repository agent 224-1, 224-2, . . . 224-N. An example of a query that may be run against credential store 226 is "which account or group of related credentials should be used when publishing to a particular (library name, repository)?"

Version Metadata Store

Version metadata store 228 is a searchable data store that maps, for a particular project, versions of published related libraries 118-1, 118-2, 118-N with one another and with versions of the common specification 104 from which the published versions of libraries 118-1, 118-2, 118-N have been derived. Version metadata store 228 may be searched via a graphical user interface of publisher 122 by, for example, a human project maintainer, in order to map data obtained from clients 108-1, 108-2, 108-2, such as report bugs, support requests, or requests to subscribe to notifications, to corresponding particular versions of published libraries and/or versions of the common specification 104 from which particular versions of published libraries were derived. This enables a human project maintainer to, for example, easily identify the version of source code that corresponds to a published version of a library used by a client that reported a bug, or to issue notifications to appropriate clients that affected versions of particular libraries should be upgraded. Version metadata store 228 facilitates communicating notifications across all repositories to which affected library versions have been published.

Version metadata store 228 can also facilitate version tracking across repositories when version numbers across the repositories are not incremented in lock-step. For example, a library a repository 120-1, 120-2, . . . 120-N might precede a common specification which produces libraries with compatible interfaces. For example, maintainers of functionally similar Java and Python libraries might collaborate on a common specification project to share resources but one of the libraries may be at version 4.1 while the other library is at version 3.14. In this case, version increment rules may prevent simply increasing the smaller version number to match with the larger version number.

In another scenario, during cross-publishing, a library to be published to one repository may fail quality control checks required by the repository, which may result in a skipped version number, such as a version 2.1 and a version 2.3 but without a version 2.2. If the repository does not allow skipped version numbers, a subsequent cross-publish will not be able to consistently use version 2.3 across all repositories.

In another scenario, version number inconsistencies may be introduced when version numbers are automatically assigned rather than being received as input controlled by the person managing the publication. In still another scenario, version number inconsistencies may arise when versions of a module repository need to carry an extra qualifier, such as alpha- or beta-, to indicate that the repository contains a test version of software.

In each of these scenarios and other situations in which cross-repository version inconsistencies may be introduced, version metadata store 228 can be used to keep track of the cross-repository versioning discrepancies by storing a mapping of repository version number data to version number data for a common specification that was used to produce the libraries that have been cross-published to the repositories.

Examples of queries that can be run against version metadata store 228 include: "for a published version of a library and an identifier of the repository to which the library version is published, which common specification version does the published library version relate to?;" "for a common specification version, which published library version and repository identifier were derived from it?;" and "for a common specification version to be published, optionally a common specification version from which it was derived, a set of module repositories to publish to), with hints as to whether the changes between the two are backwards-compatibility breaking for some or all module repositories, what are good next version numbers to publish to for each module repository?"

Version records stored in version metadata store 228 may contain a common specification version identifier, a published version identifier consisting of (a library name, a version label), and a repository identifier. Repository version metadata records may contain a repository identifier and the name of the library in that repository that is to be used for new versions of the library.

Version metadata store 228 may be implemented as a network service associated with programmer 102, or version metadata store 228 may reside in the same data store as common specification 104, in versioned metadata file(s) or as revision control system metadata.

Maintaining Library Dependencies

Figure 3:
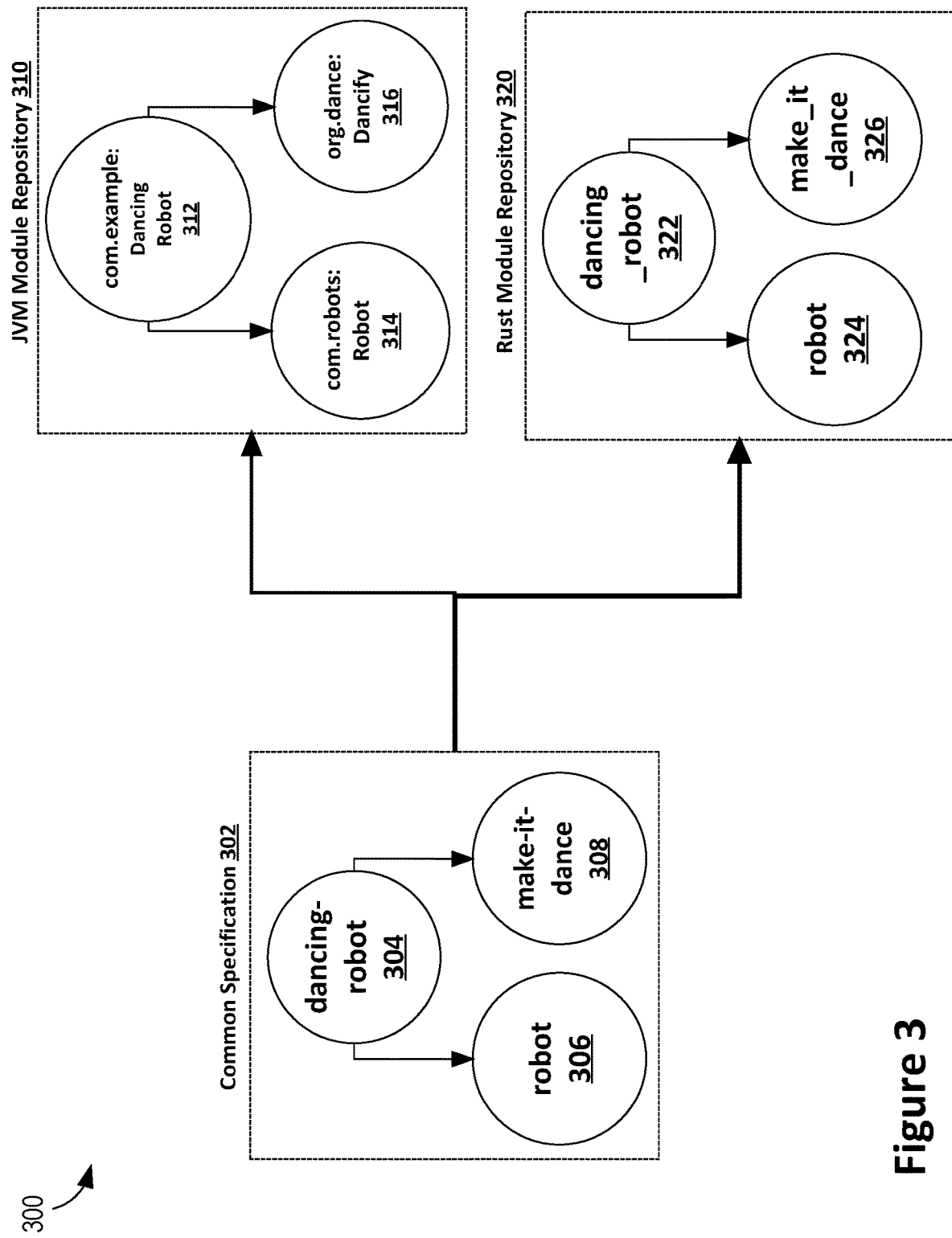
FIG. 3 is a block diagram of dependency relationships replicated in multiple different repositories.

FIG. 3 is a block diagram of dependency relationships replicated in multiple different repositories. A dependency relationship exists where a software module calls another software module to perform a particular piece of functionality instead of writing the code for that functionality directly into the first software module. When common specification 104 is used to produce multiple libraries 118-1, 118-2, 118-N, common specification 104 may depend on other common specifications. For example, FIG. 3 shows a common specification 302 for a dancing robot project.

Common specification 302 indicates that dancing-robot project 304 depends on two other modules: robot 306 and make-it-dance 308. Each of modules 306, 308 may have its own common specification. Thus when common specification 302 is cross-compiled, the common specifications for modules 306, 308 also must be cross-compiled.

Cross-compilation produces multiple different libraries for different targets. For example, cross-compiling produces, from common specification 302, a version of the dancing robot library 304, configured for JVM (JAVA Virtual Machine), com.example:DancingRobot 312, and another version of the dancing robot library 304, written in the RUST programming language, dancing_robot 322. Because the libraries 312, 322 have been created for different targets, they are published to different repositories, JVM Module Repository 310 and Rust Module Repository 320.

Coordinator 220 reads library-specific dependency metadata from common specification 302 and communicates the library specific dependency metadata to repository agents 224-1, 224-2, . . . 224-N to ensure that libraries 306, 308 are cross-compiled and published to repositories 310, 320, respectively, including the dependency metadata. For example, robot 306 is cross-compiled and published to JVM Module Repository 310 as com.robots:Robot 314 with a dependency link to com.example:DancingRobot 312, and robot 306 is cross-compiled and published to Rust Module Repository 320 as robot 324, with a dependency link to dancing_robot 322. Similarly, make-it-dance 308 is cross-compiled and published to JVM Module Repository 310 as org.dance:Dancify 316, with a dependency link to com.example:DancingRobot 312, and make-it-dance 308 is cross-compiled and published to Rust Module Repository 320 as make_it_dance 326, with a dependency link to dancing_robot 322. Thus, each dancing-robot library published for a particular module repository contains library-specific metadata indicating that, when the library is downloaded, the robot and make-it-dance libraries of that repository also are to be downloaded.

Different module repositories have different conventions for specifying dependency metadata. These conventions may be specified in a repository-specific metadata file using a repository-specific format. The repository-specific metadata file may be stored in a repository specific location in an archive, which is uploaded when a library is published to the repository. The repository-specific metadata file may be accessed by repository agents 224-1, 224-2, . . . 224-N and stored in repo metadata 224b. In this way, when a common specification specifies library dependencies, those dependency relationships are replicated through the publishing process described herein.

Dependency Remapping

Figure 5:
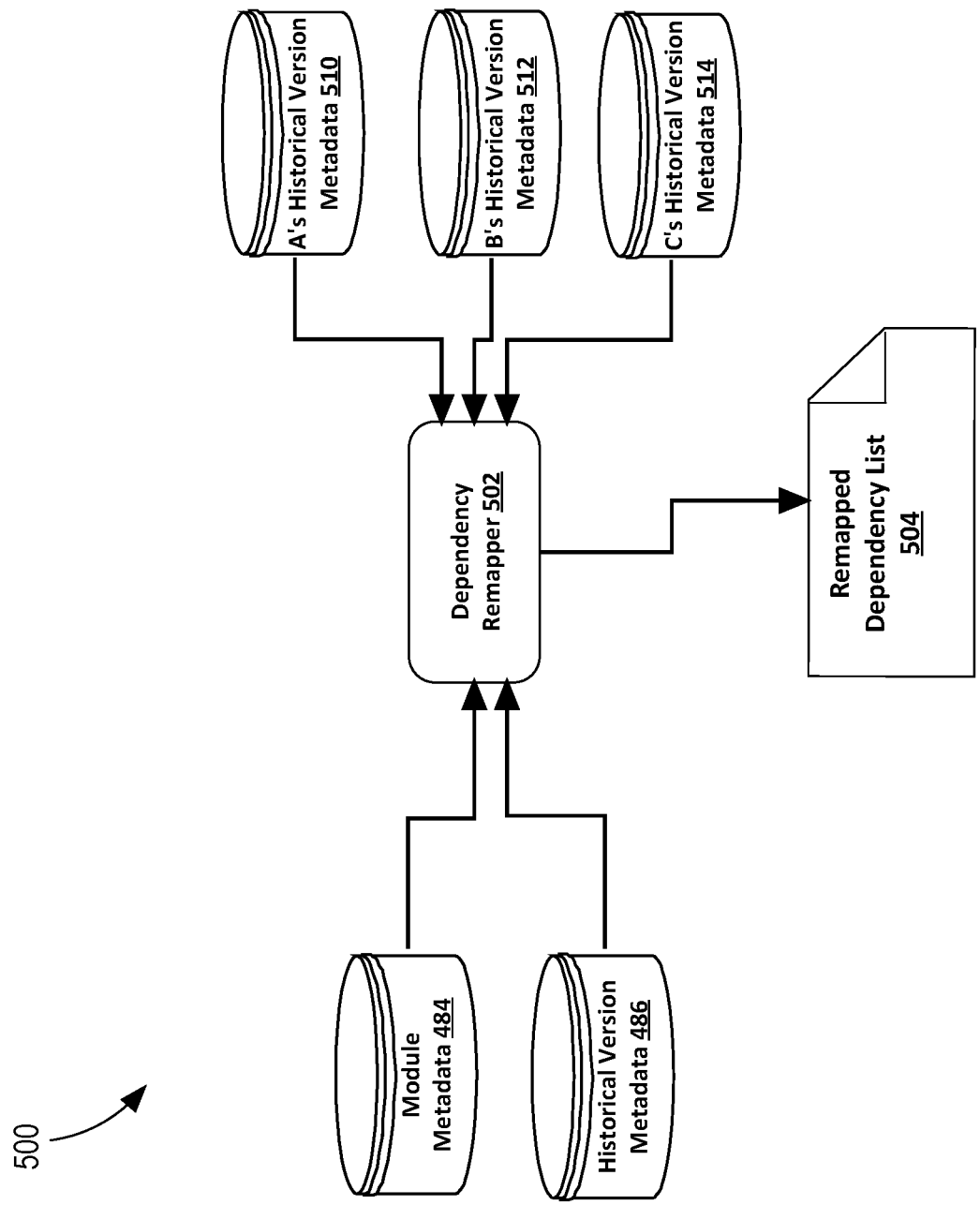
FIG. 5 is a block diagram of a dependency remapper for remapping library dependencies to a common specification.

FIG. 5 is a block diagram of a dependency remapper for remapping library dependencies to a common specification after libraries are published to repositories. Dependency remapper 502 ingests module metadata 484 and historical version metadata 486, searches one or more of repository-specific historical version metadata stores 510, 512, 514 to look up repository version data for a given dependency, and outputs a remapped dependency list 504.

An example of module metadata 484 is a file or data store that stores library metadata for a given library. An example of historical version metadata 486 is a file or data store that stores mappings of library versions to versions of a common specification. Historical version metadata 486 may be a portion of version metadata store 228, for example.

Historical version metadata stores 510, 512, 514 are repository-specific metadata stores for each of a repository A, a repository B, and a repository C, respectively. Repositories A, B, and C may correspond to repositories 120-1, 120-2, . . . 120-N. As such, version metadata stores 510, 512, 514 may be part of repo metadata 224*b*. That is, repository agents 224-1, 224-2, . . . 224-N may each have access to read data from a version metadata store 510, 512, 514 of a repository for which repository agent 224-1, 224-2, . . . 224-N has been configured.

Remapped dependency list 504 produced by dependency remapper 502 specifies module dependencies of published libraries so that those dependency relationships are maintained when published libraries are downloaded from repositories 120-1, 120-2, . . . 120-N.

Naming Libraries

A potential client for a library, such as a target client 108-1, 108-2, . . . 108-N, uses a name to search for and find that library in a repository 120-1, 120-2, . . . 120-N, and to download the library from the repository. A library name needs to be meaningful to machines so that the library can be downloaded (e.g., from the Internet) and stored in a suitable storage location on the computer that will run the program that uses the library. A library name needs to be meaningful to people so that a person planning to use a library can easily determine how to write a programming statement to connect to the library, and so that a person reading the code can follow the programmer's intent. For example, a Node.js developer might write: "require('quite-pithy');" and run, at a command line interface: "npm install quite-pithy" to cause the machine to download the library named "quite-pithy" from the NPM repository.

As shown in Table 1 below, different module repositories often require different names to meet different requirements.

TABLE 1

Examples of library names by repository and target.

| Module Repository | Target | Example Name |
|---|---|---|
| Maven | JVM | com.example:MyLibrary:1.0 |
| NPM | JavaScript | @example/my-library@1.0 |
| Gems | Ruby | my_library-1.0.0 |
| Crates.io | Rust | my_library v1.0.0 |
| OPAM | OCaml | my-library 1.0 |

Additionally, module repositories tend to grant names on a first-come first-serve basis. Variants of "quite pithy" may be available in one repository but taken in another. Since it is often desirable for libraries to have a common name by which all of the library versions published from a common specification can be referenced, cross-publishing multiple libraries to multiple repositories can be complicated by the varying requirements and naming conventions of the repositories.

Figure 4A:
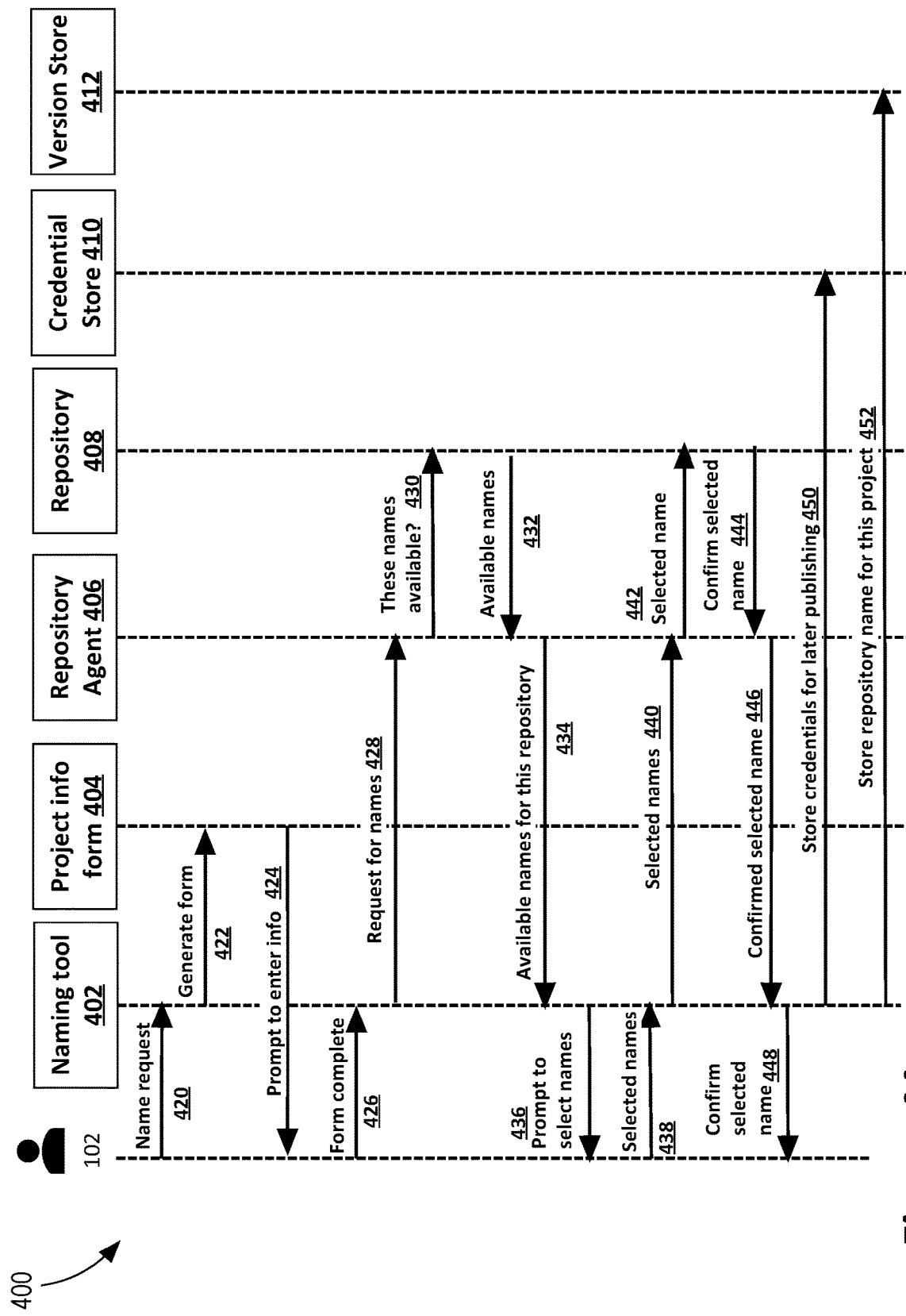
FIG. 4A is an interaction chart for a process for reserving library names including communications across different components.

FIG. 4A is an interaction chart for a process 400 for reserving library names for a publishing project, including communications across different software components of publisher 122. The software components include a naming tool 402, a project information form 404, a repository agent 406, a repository 408, a credential store 410, and a version store 412.

Naming tool 402 and project info form 404 are software components that may be implemented as modules of publisher 122 or coordinator 220. Repository agent 406 is a particular implementation of a repository agent 224-1, 224-2, . . . 224-N that is configured to perform pre-publication actions for repository 408. Repository 408 is a particular implementation of a repository 120-1, 120-2, . . . 120-N to which a library that is the subject of a name request 420 may be published. Credential store 410 is a particular implementation of credential store 226. Version store 412 is a particular implementation of version metadata store 228.

Naming tool 402 is an optional tool for reserving available library names across multiple module repositories to enable a project to publish functionally related libraries using available names, and for storing information to enable cross-publishing to those repositories using those names. At 420, naming tool 402 receives a name request from programmer 102 and at 422 generates a data entry form using project info form 404. At 424, project info form 404 generates a prompt for input of name information by programmer 102. The prompt generated by project info form 404 may include a set of alternative library name options, which is based on information provided in the name request. While the name request is shown as including information entered by a human, the name request may alternative be generated by an automated agent.

Examples of information that may be collected via project info form 404 to enable naming tool 402 to determine available names suitable for the desired module repositories includes, along with information necessary to create accounts and credentials, phrases describing the library, e.g. dancing robots, make robots dance; the name of the organization responsible for the project, e.g. 70's dance preservation society; URLs (Uniform Resource Locators) for documentation, bug reports, source code hosting, and other files; email addresses or other handles for account creation; a preferred human language for emails from the module repository; a brief description of the project.

At 426, naming tool 402 determines that the data entered into project info form 404 is complete. At 428, naming tool 402 sends a signal containing a request for available names for the publishing project to repository agent 406. At 430, repository agent 406 sends a signal to repository 408 that contains a request for information as to whether any of the names specified in request for names 428 are available in repository 408. At 432, repository 408 sends a signal to repository agent 406 identifying available names. At 434, repository agent 406 sends a signal to naming tool 402 containing available names in the repository, e.g., names indicated by repository 408 as available.

At 436, naming tool 402 generates a prompt for programmer 102 to select one or more names from the available names for the repository. At 438, naming tool 402 receives one or more name selections from programmer 102. At 440, naming tool 402 sends a signal to repository agent 406 containing the one or more names selected by programmer 102. At 442, repository agent 406 sends a signal containing a selected name of the one or more names selected by programmer 102 to repository 408.

At 444, repository 408 confirms that the selected name 442 has been reserved for the library in the repository. At 446, repository agent 406 sends a signal containing a confirmation of the selected name to naming tool 402. At 448, naming tool 402 sends a signal containing a confirmation of the selected name to programmer 102.

Naming tool 402 may additionally collect information needed for subsequent pre-publication actions, including credentials needed to authenticate accounts used to initiate or approve publication or pre-publication actions. At 450, naming tool 402 sends a signal containing an instruction to store security credentials for a later publishing-related task to credential store 410. The security credentials may be non-time-limited credentials received from programmer 102, e.g., via project info form 404. At 452, naming tool 402 sends a signal containing an instruction to store the repository name of repository 408 along with project information (e.g., library name or identifier for the library to be published to repository 408 using the selected name) to version store 412.

In an alternative implementation, version store 412 stores a history of names owned by projects. Instead of sending request 428, naming tool 402 sends a signal containing a query to version store 412 to determine whether the project already owns names in some repositories.

Figure 4B:
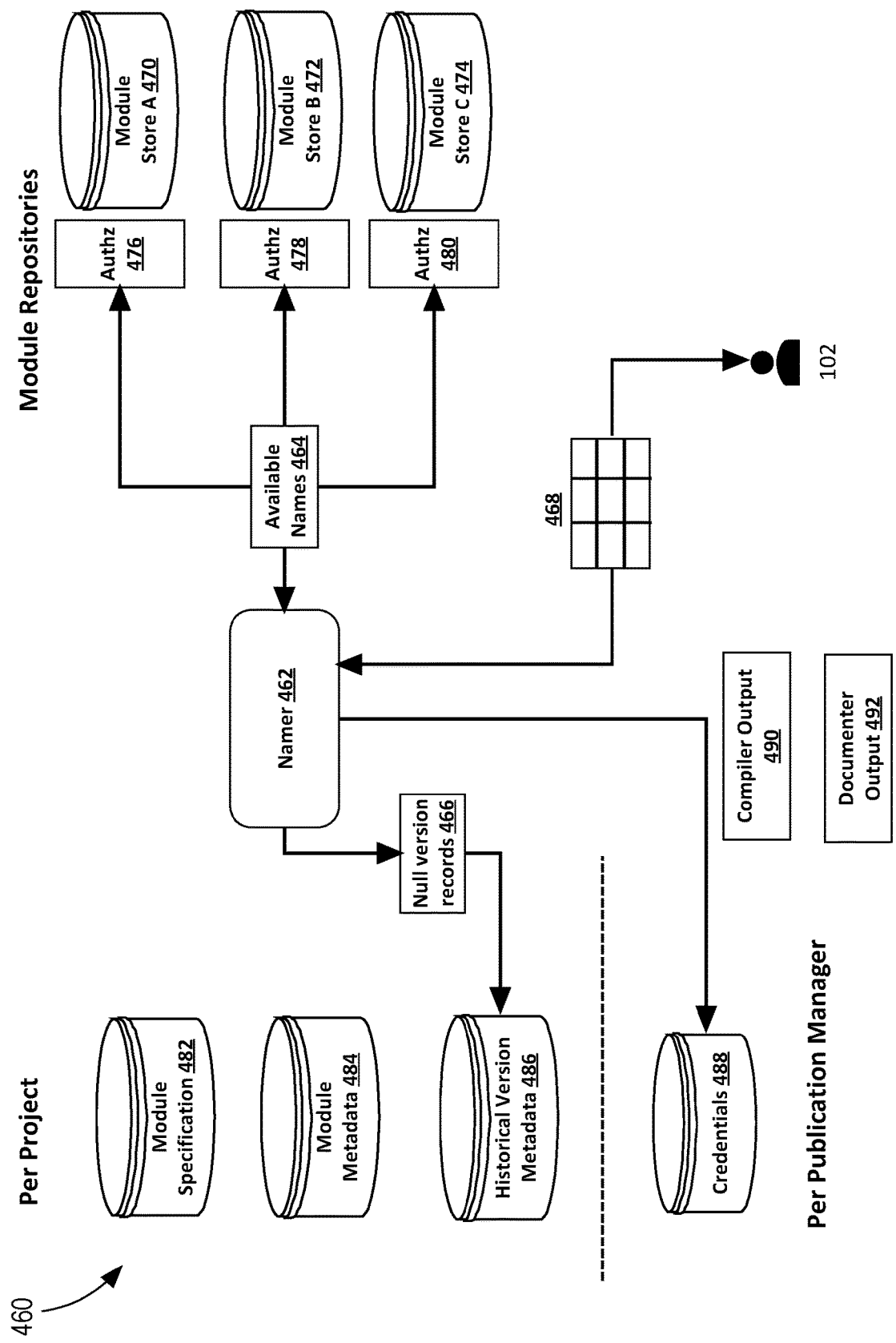
FIG. 4B is a block diagram of a namer for naming libraries across multiple repositories.

FIG. 4B is a block diagram of a namer for naming libraries across multiple repositories. Namer 462 is an implementation of naming tool 402. Whereas FIG. 4 illustrates communications between various software components, FIG. 4B more clearly illustrates how a name request for a project containing multiple libraries may be distributed by multiple repository agents to multiple repositories.

A multi-library, multi-repository publication project 460 is composed of stored data including module specification 482, module metadata 484, and historical version metadata 486. Module specification 482 is a particular implementation of common specification 104 relating to project 460. Module metadata 484 is a particular implementation of target model corpus 116 relating to project 460. Historical version metadata 486 is a particular implementation of version metadata store 228 relating to project 460.

A publication manager, such as programmer 102, has associated credentials 488, as well as compiler output 490 and documenter output 492. Credentials 488 is a particular implementation of credential store 228 relating to the publication manager. Compiler output 490 is output of source-to-source compiler 110 relating to project 460. Documenter output 492 includes, for example, README files and other non-code documentation relating to project 460.

Publication manager 102 and namer 462 exchange communications relating to a name request using a form 468. Form 4698 is an implementation of project info form 404. Namer 462 also exchanges communications relating to available names 464 with multiple module repositories 470, 472, 474 via their respective authorization mechanisms 476, 478, 480. Repositories 470, 472, 474 are particular implementations of repositories 120-1, 120-2, . . . 120-N relating to project 460. Authorization mechanisms 476, 478, 480 are particular implementations of repository agents 224-1, 224-2, . . . 224-N relating to repositories 470, 472, 474.

Namer 462 stores credential data in credentials 488 for later use. Namer 462 reserves names for the project across repositories by creating and storing null version records 466 in historical version metadata 486. A null version record 466 contains the project names that will be used later to publish the libraries in the project to the multiple repositories, and is "null" because the record has not yet been populated with publication data. In other words, null version record 466 represents a library name reservation.

Coordination of Repository Agents

Figure 6:
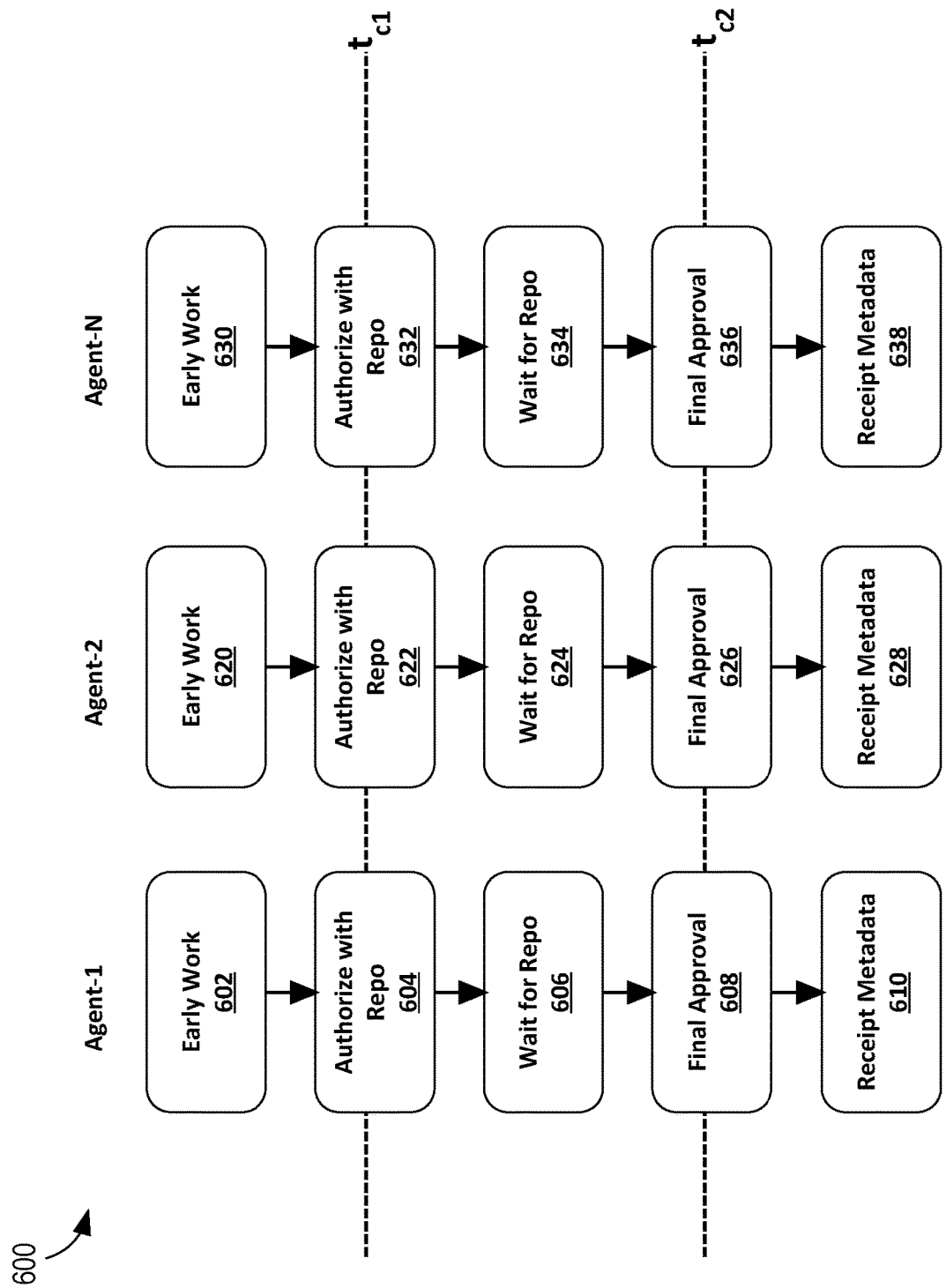
FIG. 6 is a timing chart for a process for coordinating pre-publication actions for multiple libraries across multiple repository agents.

FIG. 6 is a flow diagram of a process 600 for coordinating pre-publication actions for multiple libraries across multiple repository agents. Coordinator 220 is an automated agent responsible for coordinating the actions of a group of repository agents during the publication workflow. In process 600, coordinator 220 has distributed pre-publication, publication, and post-publication actions to multiple repository agents: Agent-1, Agent-2, and Agent-N.

At a high level, the pre-publication actions performed by Agent-1, Agent-2, and Agent-N appear the same. That is, each of Agent-1, Agent-2, and Agent-N performs a respective early work task 602, 630, 630. The early work tasks 602, 630, 630 are followed by each of Agent-1, Agent-2, and Agent-N performing a respective authorize with repo task 604, 622, 632. The authorize with repo tasks 604, 622, 632 are followed by each of Agent-1, Agent-2, and Agent-N performing a respective wait for repo task 606, 624, 634 task. The wait for repo tasks 606, 624, 634 are followed by each of Agent-1, Agent-2, and Agent-N performing a respective final approval task 608, 626, 636. The final approval tasks 608, 626, 636 are followed by each of Agent-1, Agent-2, and Agent-N performing a respective receipt metadata task 610, 628, 638.

However, publishing to a repository involves using repository-specific software tools and/or plugins to group compiler outputs, compiler inputs, ancillary files like documentation, and metadata files, into one or more archive files (or data bundles) in a repository-specific manner, and send those files via a network to machines working on behalf of the repository. Each of Agent-1, Agent-2, and Agent-N is configured to perform tasks for a different repository. Thus, tasks performed by Agent-1, Agent-2, and Agent-N at each stage of process 600 are likely to be different. For example, early work 602 performed by Agent-1 for a repository-1 may include different actions than early work 620 performed by Agent-2 for a repository-2, and so on.

An example of an early work task 602, 620, 630 is a repository agent assembling library files and other information needed for a data bundle to be published. Examples of information that may be assembled by a repository agent as part of an early work task 602, 620, 630 include a group of repositories to which to publish (which may be given as input, specified in project metadata, inferred from the version store, or inferred from the files encompassing the libraries to publish if already generated), a group of appropriately configured repository agents from the corpus of repository agents, a group of files encompassing the libraries to publish (which may be received as input or generated by invoking the cross compiler on a common specification received as input, or repository agents may be invoked to generate library files from a specification received as input), appropriate version numbers for each module repository (which may be specified as inputs, derived from the version store, or tentative, where the corresponding module repository assigns a number), and non-time sensitive credentials needed as proof of authority to each module repository.

If all of the information required by the repository is not available or retrievable the repository agent or coordinator 220 may abort the publication. When a repository agent has completed one or more pre-publication tasks or at other times, the repository agent may send a status signal to coordinator 220 that contains a status of execution of pre-publication actions on a software library that has been mapped to the repository agent.

An example of an authorize with repo task 604, 622, 632 is a repository agent receiving a signal containing a non-time-limited credential from coordinator 220 or obtaining the non-time-limited credential directly from credential store 226, and the repository agent sending a signal containing the non-time-limited credential to a repository to establish that the publication manager holding the credential is authorized to publish a library to the repository. An example of a wait for repo task 606, 624, 634 is a repository agent suspending action until a signal containing an authorization to proceed with a task is received from the repository.

An example of a final approval task 608, 626, 636 is a repository agent obtaining a time-limited credential from a human publication manager, sending a signal containing the time-limited credential to the repository and receiving, from the repository, a signal containing an approval to proceed with a publishing action. An example of a receipt metadata task 610, 628, 638 is a repository agent receiving version metadata for a published library version from the repository and storing the version metadata in version metadata store 228.

Different repositories require different amounts of credential information to prove that the person managing the publishing task is authorized to publish new versions of a library to the repositories. Credential information includes non-time-limited credentials and time-limited credentials.

Non-time-limited credentials are credentials that can be obtained in advance of a particular task. That is, other tasks may be performed between the time that the non-time-limited credential is obtained and the time that a particular task is performed.

Examples of non-time-limited credentials include account names, e.g.; first.last@organization.org, secrets or nonces not applied to the archives to upload, passwords associated with an account name, master passwords or keys used to unlock a password manager or keystore to retrieve other proof of authority elements, pre-generated nonces that can be embedded in unpublished scripts, also known as automation tokens, and recovery codes (such as codes stored in a physical safe to allow a person to recover control over an account in the event that a password is forgotten or a hardware key is lost or damaged), and cryptographic secrets applied to the archive, e.g. cryptographic signatures and/or hashes.

Time-limited credentials are credentials that cannot be obtained in advance of a particular task. That is, the credential must be obtained within a short amount of time (e.g., minutes) prior to performing a particular task.

Examples of time-limited credentials include multi-factor authentication answers (e.g. U2F or 2FA) that involve the repository and a device owned by the publication manager sharing a secret. Multi-factor authentication uses cryptographic processes along with a piece of information that is apparent to both the repository and the device owned by the publication manager, such as a clock to check that the publication manager has physical access to something that they should have access to. Time-limited credentials usually depend on a clock, and thus require the publication manager to perform some action with their device.

Traditionally, publishing multiple libraries to multiple repositories has required the human publication manager to enter multiple different credentials into multiple different input boxes, without making any errors, such as typos or putting the wrong credential in the wrong box. Also, not all module repositories are designed for authorization based on role, so sometimes credentials need to be shared across publication managers. As a result, it has been impractical to provide high levels of security for cross-publishing projects.

The disclosed techniques address these and other difficulties. In FIG. 6, timestamps $t_{c1}$ and $t_{c2}$ represent times at which coordinator 220 coordinates actions of Agent-1, Agent-2, and Agent-N. At time $t_{c1}$, coordinator 220 obtains non-time-limited credentials and instructs repository agents Agent-1, Agent-2, and Agent-N to do work that does not require proof of authority based on time-limited credentials. Examples of work that may be performed by repository agents Agent-1, Agent-2, and Agent-N based on non-time-limited credentials include rearranging files into a form that meets a module repository's conventions, uploading files that will be committed upon proof of authority but which can in the meantime undergo quality control checks, presenting non-time-limited credentials, and requesting verification that a version number has not been used, or requesting an alternative version number if a version number has been used. Different repository agents Agent-1, Agent-2, and Agent-N may take different amounts of time to perform these pre-publication tasks, as long as none of these pre-publication tasks require interaction with a human person or use time-limited credentials obtained from a person.

Coordinator 220 waits for all repository agents Agent-1, Agent-2, and Agent-N that need to do work with time-limited credentials to complete the pre-publication tasks performable with the non-time-limited credentials before any repository agent can proceed to tasks that require time-limited credentials. To do this, coordinator 220 waits to receive, from the repository agents, a status signal containing a status of execution of pre-publication actions that indicates that the pre-publication tasks are complete.

At time ta, coordinator 220 instructs the repository agents needing to perform tasks with time-limited credentials to proceed in lock-step so that a smaller number of time-limited credentials needs to requested from the human publication manager.

At time ta, coordinator 220 requests time limited credentials (such as multi-factor authentication credentials) from the human publication manager if required, or automates production of the time-limited credentials if possible. Coordinator 220 distributes the time-limited credentials to the appropriate repository agents.

If one or more repository agents have more alternating non-time sensitive tasks and/or time-sensitive steps, then coordinator 220 allows the repository agents to proceed individually with the non-time sensitive tasks. However, coordinator 220 may require repository agents to enter the time-sensitive tasks in lock-step.

During process 600, coordinator 220 may receive information from repository agents, including, for example, a final version identifier or combined name/version of a published library, or a success indicator or error message indicating that the library is unsuitable to be published to a particular repository. If coordinator 220 receives a signal containing a message that a publication was successful, coordinator 220 updates the version store to store the mapping of the common specification version to the published version of the library. Coordinator 220 may delegate the task of updating the version store to repository agents.

Coordinator 220 may report success messages and error messages to the human publication manager, either as received from repository agents or as a summary of messages received from multiple repository agents at the end of a stage or the end of the process as a whole.

Managing Cross-Publication

Figure 7:
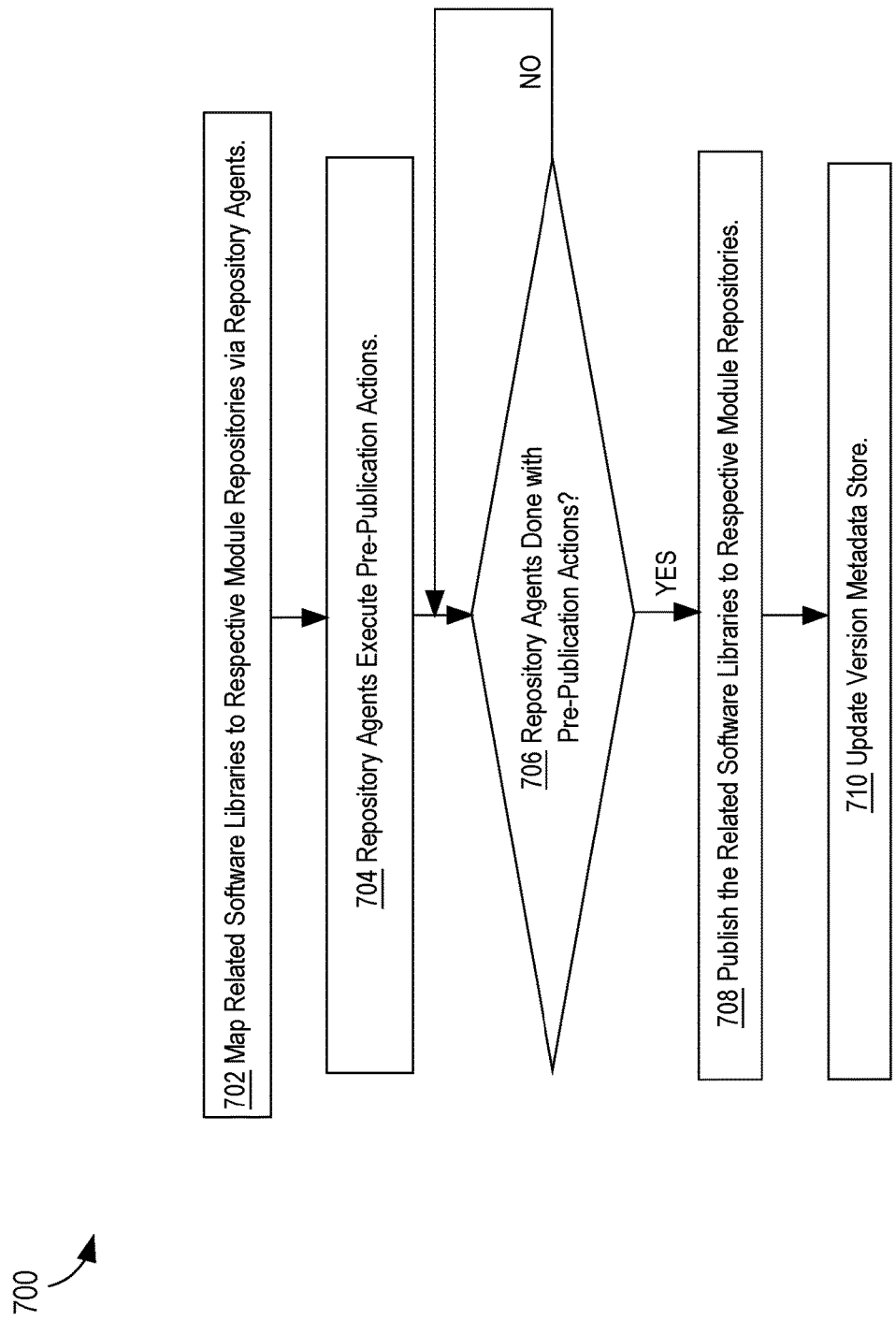
FIG. 7 is a flow diagram of a process for publishing many software libraries generated from a common specification to many repositories.

FIG. 7 is a flow diagram of a process 700 for publishing many software libraries generated from a common specification to many repositories.

Operation 702 when executed by one or more processors causes one or more computing devices to map related software libraries to respective module repositories via repository agents. Examples of related software libraries include software libraries that have been created from a common specification but have been created using different programming languages, such as by a cross-compiler. Another example of related software libraries is a group of software libraries all created using the same programming language. Operation 702 may perform mapping of software libraries to module repositories via repository agents by, for example matching library metadata of the software libraries to repository metadata of repository agents.

Operation 704 when executed by one or more processors causes one or more computing devices to, by the repository agents of operation 702, execute pre-publication actions on the software libraries of operation 702. Examples of pre-publication actions are described above with reference to FIG. 6 and include assembling library data bundles, performing tasks that do not require a time-limited credential and tasks that require a time-limited credential.

Operation 706 when executed by one or more processors causes one or more computing devices to determine whether the repository agents of operation 702 have finished performing the pre-publication actions of operation 704. If the pre-publication actions are not finished, process 700 remains in operation 706 and waits for the pre-publication actions to complete. If the pre-publication actions are finished, process 700 proceeds to operation 708.

Operation 708 when executed by one or more processors causes one or more computing devices to publish the related software libraries of operation 702 to respective module repositories to which the related software libraries have been mapped by operation 702. Operation 708 may include one or more repository agents to wait for approval from a repository of a time-limited credential. Operation 708 may be performed by the repository agents of operation 702 or by a different component of the one or more computing devices.

Operation 710 when executed by one or more processors causes one or more computing devices to update a version metadata store, such as version metadata store 228. Operation 710 may be performed by the repository agents and includes storing, in a version metadata store, mappings of versions of a common specification to versions of published libraries and module repositories. The version metadata store is implemented via a common network-available service, or as part of a module repository, or as metadata stored with a common specification, for example. A credential used to authorize publication to module repositories may also be used to authorize version metadata updates.

Basic Computing Device

The techniques may be implemented by at least one computing device. If by more than one computing device, the techniques may be implemented in whole or in part using a combination of computing devices that are coupled together using a network, such as a packet data network. A computing device used in an implementation of the techniques may be hard-wired to perform some or all of the techniques, or may include digital electronic devices such as at least one application-specific integrated circuit (ASIC) or field programmable gate array (FPGA) that is persistently programmed to perform some or all of the techniques, or may include at least one general purpose hardware processor programmed to perform some or all of the techniques pursuant to program instructions in firmware, memory, other storage, or a combination. A computing device used in an implementation of the techniques may also combine custom hard-wired logic, ASICs, or FPGAs with custom programming to accomplish some or all of the techniques. A computing device used in an implementation of the techniques may be a server computing device, a workstation computing device, a personal computing device, a portable computing device, a handheld computing device, a mobile computing device or any other computing device that incorporates hard-wired or program logic to implement some or all of the techniques.

Figure 8:
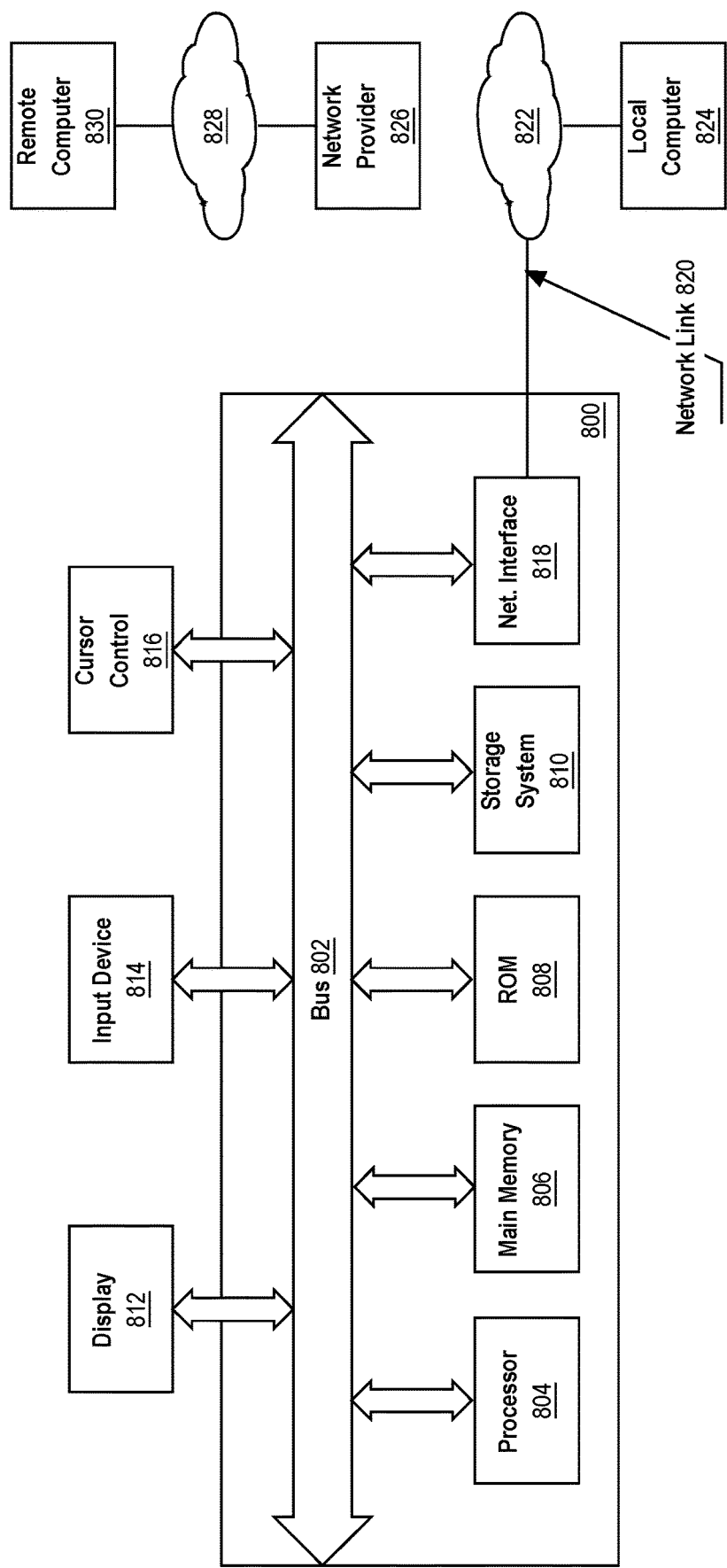
FIG. 8 is a block diagram of an example basic computing device that may be used in an implementation of the techniques.

FIG. 8 is a block diagram of an example basic computing device that may be used in an implementation of the techniques. In the example of FIG. 8, computing device 800 and instructions for implementing some or all of the techniques in hardware, software, or a combination of hardware and software, are represented schematically, for example as boxes and circles, at the same level of detail that is commonly used by persons of ordinary skill in the art to which this disclosure pertains for communicating about computer architecture and computing device implementations.

Computing device 800 includes an input/output (I/O) subsystem 802 which may include a bus or other communication mechanism for communicating information or instructions between the components of the computing device 800 over electronic signal paths. The I/O subsystem 802 may include an I/O controller, a memory controller and at least one I/O port. The electronic signal paths are represented schematically in the drawings, for example as lines, unidirectional arrows or bidirectional arrows.

At least one hardware processor 804 is coupled to I/O subsystem 802 for processing information and instructions. Hardware processor 804 may include, for example, a general-purpose microprocessor or microcontroller or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computing device 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory storage media accessible to processor 804, can render computing device 800 into a special-purpose machine that is customized to perform the operations specified in the instructions.

Computing device 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM, and may be coupled to I/O subsystem 802 for storing information and instructions. Storage 810 is an example of a non-transitory computer-readable medium that may be used to store instructions and data which when executed by the processor 804 cause performing computer-implemented methods to execute some or all of the techniques.

The instructions in memory 806, ROM 808 or storage 810 may comprise one or more sets of instructions that are organized as modules, methods, objects, functions, routines or calls. The instructions may be organized as one or more computer programs, operating system services or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computing device 800 may be coupled via I/O subsystem 802 to at least one output device 812. Output device 812 may be a digital computer display. Examples of a display that may be used include a touch screen display or a light-emitting diode (LED) display or a liquid crystal display (LCD) or an e-paper display. Computing device 800 may include other types of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

An input device 814 may be coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

Computing device 800 may comprise an internet of things (IoT) device or other computing appliance in which one or more of the output device 812, input device 814, and control device 816 are omitted. The input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computing device 800 is a mobile or portable computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computing device 800. Output device 812 may include hardware, software, firmware and interfaces for generating position reporting packets, notifications, pulse or heartbeat signals, or other recurring data transmissions that specify a position of the computing device 800, alone or in combination with other application-specific data, directed toward host 824 or server 830.

Computing device 800 may implement some or all of the techniques using customized hard-wired logic, at least one ASIC or FPGA, firmware or program instructions or logic which when loaded and used or executed in combination with computing device 800 causes or programs computing device 800 to operate as a special-purpose machine.

The techniques performed by computing device 800 may be performed in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform some or all of the techniques. Hard-wired circuitry may be used in place of or in combination with software instructions.

The term "storage media" as used herein refers to any non-transitory computer-readable media that store data or instructions that cause a machine to operation in a specific fashion. Such storage media may comprise non-volatile media or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computing device 800 can receive the data on the communication link and convert the data to be read by computing device 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computing device 800 also includes a communication interface 818 coupled to bus 802. Communication interface 818 provides a two-way data communication coupling to network link 820 that is directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls.

Computing device 800 and server 830 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or NoSQL, an object store, a graph database, a flat file system or other data storage.

Computing device 800 can send messages and receive data and instructions, including program code, through a network, network link 820 and communication interface 818. In the Internet example, server 830 might transmit a requested code for an application program through Internet 828, ISP 826, local network 822 and communication interface 818. The received code may be executed by processor 804 as it is received, or stored in storage 810, or other non-volatile storage for later execution.

Basic Software System

Figure 9:
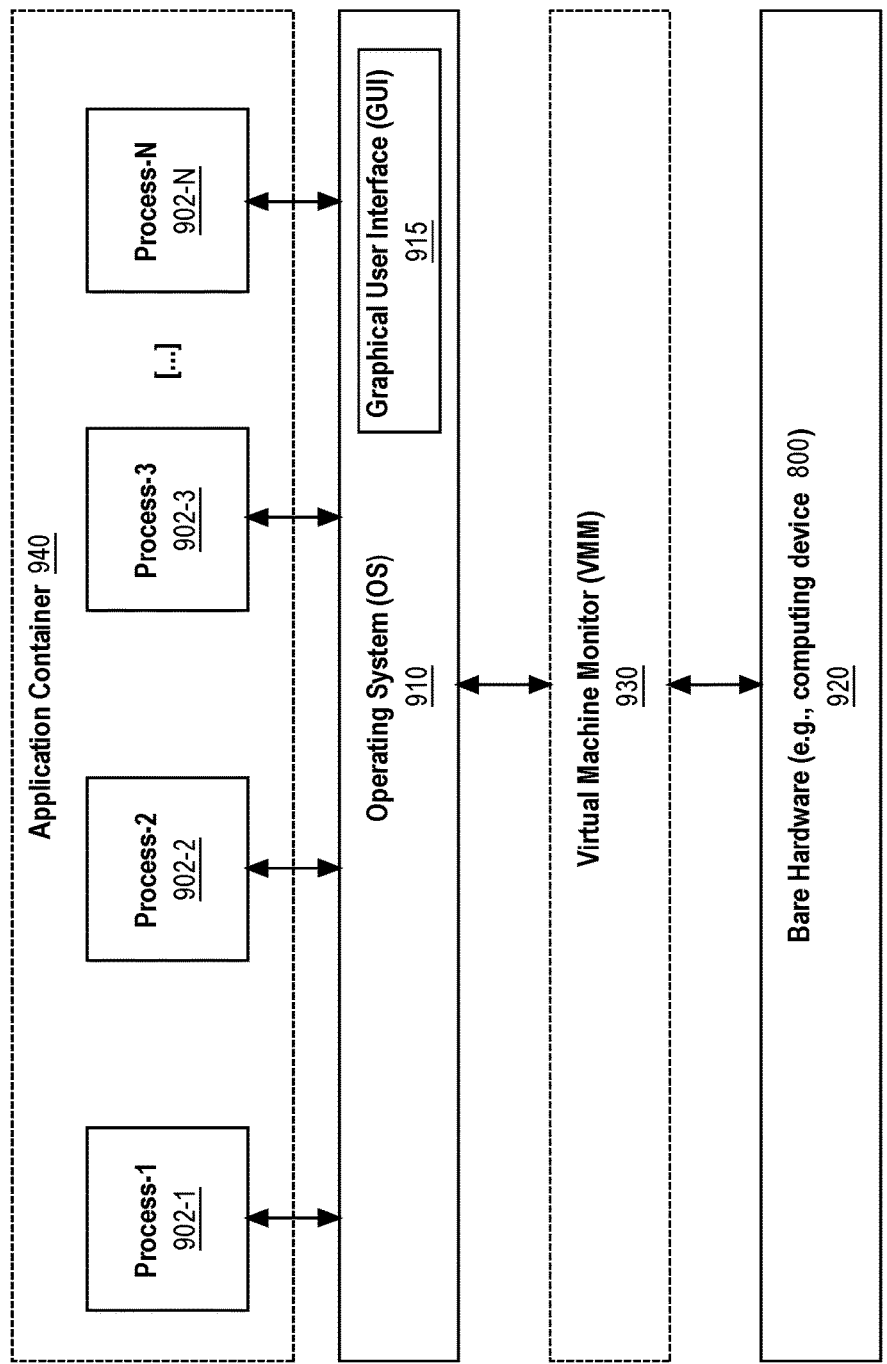
FIG. 9 is a block diagram of an example basic software system that may be employed for controlling the operation of the basic computing device of FIG. 8.

FIG. 9 is a block diagram of an example basic software system 900 that may be employed for controlling the operation of computing device 800 of FIG. 8. Software system 900 and its components, including their connections, relationships, and functions, is meant to be an example only, and not meant to limit implementations of the techniques. Other software systems suitable for implementing the techniques may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

OS 910 manages low-level aspects of computer operation, including managing execution of processes, represented as 902-1, 902-2, 902-3 . . . 902-N, memory allocation, file input and output (I/O) and device I/O. One or more application programs may be "loaded" (e.g., transferred from fixed storage 810 into memory 806) for execution as one or more processes by the system 900. The applications or other software intended for use on computing device 800 may also be stored as a set of downloadable computer-executable instructions, for example, for downloading and installation from an Internet location (e.g., a Web server, an app store or other online service).

The execution of application program instructions may implement a process (e.g., 902-2) in the form of an instance of a computer program that is being executed and consisting of program code and its current activity. Depending on the operating system (OS), a process (e.g., 902-3) may be made up of multiple threads of execution that execute instructions concurrently. In this context, a computer program is a passive collection of instructions, while a process (e.g., 902-1) may be the actual execution of those instructions.

Several processes (e.g., 902-1 and 902-2) may be associated with the same program; for example, opening up several instances of the same program often means more than one process is being executed, or a program that initially launches as a single process may subsequently spawn (e.g., fork) additional processes.

OS 910 may implement multitasking to allow processes 902-1, 902-2, 902-3 . . . 902-N to share processor 804. While each processor 804 or core of the processor executes a single task at a time, computing device 800 may be programmed to implement multitasking to allow each processor to switch between tasks that are being executed without having to wait for each task to finish. Switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. For security and reliability, OS 910 may prevent direct communication between independent processes, providing strictly mediated and controlled inter-process communication functionality.

In some instances, processes 902-1, 902-2, 902-3 . . . 902-N and the application programs they implement may execute within application container 940. Application containers generally are a mode of operation of OS 910 in which OS 910 allows the existence of multiple isolated user space instances to run on OS 910. Application container 940 is an example of one such instance. The instances themselves are sometimes alternatively referred to as zones, virtual private servers, partitions, virtual environments, virtual kernels, or jails. Application containers provide a mechanism whereby finite hardware computing resources such as CPU time and storage media space can be allocated among the instances.

Software system 900 includes a graphical user interface (GUI) 915, for receiving user commands and data in a graphical (e.g., "point-and-click" or "touch gesture") fashion. These inputs, in turn, may be acted upon by system 900 in accordance with instructions from operating system 910 or processes 902-1, 902-2, 902-3 . . . 902-N. GUI 915 also serves to display the results of operation from OS 910 and processes 902-1, 902-2, 902-3 . . . 902-N 902, whereupon the user may supply additional inputs or terminate the session (e.g., log off).

OS 910 can execute directly on bare hardware 920 (e.g., processor 804) of computing device 800. Alternatively, a hypervisor or virtual machine monitor (VMM) 930 may be interposed between bare hardware 920 and OS 910. In this configuration, VMM 930 acts as a software "cushion" or virtualization layer between OS 910 and bare hardware 920 of computing device 800.

VMM 930 instantiates and runs one or more virtual machine instances ("guest machines"). Each guest machine comprises a "guest" operating system, such as OS 910, and one or more applications, such as applications 902, designed to execute on the guest operating system. VMM 930 presents the guest operating systems with a virtual operating platform and manages the execution of the guest operating systems.

In some instances, VMM 930 may allow a guest operating system to run as if it is running on bare hardware 920 of computing device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930. In these instances, the guest operating system is "aware" that it executes on a virtual machine monitor. In other words, VMM 930 may provide para-virtualization to a guest operating system in some instances.

Cloud Computing

The techniques may be implemented in a "cloud computing" environment. The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (e.g., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (e.g., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Additional Examples

Illustrative examples of the technologies disclosed herein are provided below. An embodiment of the technologies may include any of the examples or a combination of the described below.

In an example 1, a method includes, for each software library of a plurality of software libraries generated from a common specification, mapping the software library to a repository agent of a plurality of repository agents; the plurality of repository agents each configured to execute one or more source code repository-specific pre-publication actions for a different source code repository of a plurality of source code repositories; receiving, from the repository agent, a status signal containing a status of execution of the one or more source code repository-specific pre-publication actions on a software library that has been mapped to the repository agent; in response to the status signal, publishing the plurality of software libraries to respective different source code repositories of the plurality of source code repositories.

An example 2 includes the subject matter of example 1, further including sending a first credential signal containing a non-time-limited credential to the plurality of repository agents; each repository agent configured to execute the one or more source code repository-specific pre-publication actions in response to receiving the first credential signal. An example 3 includes the subject matter of example 2, further including performing the publishing in response to receiving a second credential signal containing a time-limited credential. An example 4 includes the subject matter of any of examples 1-3, further including creating and storing in a searchable data store a mapping of a version of a published software library of the plurality of software libraries to one or more of a version of the common specification and another version of the published software library. An example 5 includes the subject matter of any of examples 1-4, further including creating and storing in a searchable data store a mapping of a version of the common specification to a version of a source code repository of the plurality of source code repositories and a version of a published software library of the plurality of software libraries. An example 6 includes the subject matter of any of examples 1-5, further including creating and storing, in a searchable datastore, a mapping of credential data to a source code repository of the plurality of source code repositories and a published software library of the plurality of software libraries. An example 7 includes the subject matter of any of examples 1-6, where the one or more source code repository-specific pre-publication actions includes one or more of generating a plurality of library name options for a software library of the plurality of software libraries, determining whether a library name option for the software library is available in a source code repository, obtaining a plurality of alternative library name options for the software library from the source code repository, communicating a library name reservation for the software library to the source code repository. An example 8 includes the subject matter of any of examples 1-7, further including determining, based on the common specification, a dependency relationship between a software library of the plurality of software libraries and another software library of the plurality of software libraries, and creating and storing dependency metadata that represents the dependency relationship in a format that is specific to a source code repository of the plurality of source code repositories. An example 9 includes the subject matter of any of examples 1-8, further including using the stored dependency metadata, determining a common specification for the other software library. An example 10 includes the subject matter of any of examples 1-9, further including performing the mapping in response to receiving a second signal containing an indication that the common specification is suitable for publishing.

In an example 11, one or more non-transitory storage media storing instructions which, when executed by one or more computing devices, cause the one or more computing devices to perform a method including: for each software library of a plurality of software libraries, mapping the software library to a repository agent of a plurality of repository agents; the plurality of repository agents each configured to execute one or more source code repository-specific pre-publication actions for a different source code repository of a plurality of source code repositories; receiving, from the repository agent, a signal containing a status of execution of the one or more source code repository-specific pre-publication actions on a software library that has been mapped to the repository agent; in response to the signal, causing publishing of the plurality of software libraries to respective different source code repositories of the plurality of source code repositories.

An example 12 includes the subject matter of example 11, where the method further includes executing the one or more source code repository-specific pre-publication actions in response to receiving a first credential signal containing a non-time-limited credential. An example 13 includes the subject matter of example 12, where the method further includes causing the publishing in response to receiving a second credential signal containing a time-limited credential. An example 14 includes the subject matter of any of examples 11-13, where executing the one or more source code repository-specific pre-publication actions on the software library further includes one or more of generating a plurality of library name options for the software library, determining whether a library name option for the software library is available in a source code repository, obtaining a plurality of alternative library name options for the software library from the source code repository, communicating a library name reservation for the software library to the source code repository. An example 15 includes the subject matter of any of examples 11-14, where the method further includes generating a signal containing a human-readable description of a repository agent.

In an example 16, a computing system includes: one or more processors; storage media; and instructions stored in the storage media and which, when executed by the computing system, cause the computing system to perform: mapping at least two software libraries to respective repository agents of a plurality of repository agents; the at least two software libraries each created using a different programming language; the respective repository agents each configured to execute a different set of pre-publication actions for a different particular source code repository of a plurality of source code repositories; in response to determining that the respective repository agents have completed execution of respective different sets of pre-publication actions on the at least two software libraries, publishing the at least two software libraries to respective source code repositories of the plurality of source code repositories. An example 17 includes the subject matter of example 16, further including instructions stored in the storage media and which, when executed by the computing system, cause the computing system to provide a signal containing a non-time-limited credential to the respective repository agents; the respective repository agents each configured to perform the one or more pre-publication actions in response to receiving the signal containing the non-time-limited credential. An example 18 includes the subject matter of example 16 or example 17, where the one or more pre-publication actions includes one or more of generating a plurality of library name options for a software library, determining whether a library name option for the software library is available in a source code repository, obtaining a plurality of alternative library name options for the software library from the source code repository, communicating a library name reservation for the software library to the source code repository. An example 19 includes the subject matter of any of examples 16-18, further including instructions stored in the storage media and which, when executed by the computing system, cause the computing system to perform determining a dependency relationship between a software library of the at least two software libraries and another software library of the at least two software libraries, and creating and storing dependency metadata that represents the dependency relationship in a format that is specific to a source code repository of the plurality of source code repositories, and using the stored dependency metadata, determining a common specification for the other software library of the at least two software libraries. An example 20 includes the subject matter of any of examples 16-19, further including instructions stored in the storage media and which, when executed by the computing system, cause the computing system to perform the mapping in response to detecting a signal that a common specification is suitable for publishing. An example 21 includes the subject matter of any of examples 16-20, further including instructions stored in the storage media and which, when executed by the computing system, cause the computing system to perform mapping at least two software libraries to different repository agents of the plurality of repository agents.

Other Aspects of the Disclosure

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

The invention claimed is:

1. A method, comprising:
   for each library of a plurality of libraries generated from a common specification, mapping the library to a repository agent of a plurality of repository agents, each repository agent of the plurality of repository agents for a module repository of a plurality of module repositories;
   each repository agent of the plurality of repository agents executing a set of one or more pre-publication actions for the library mapped to the repository agent;
   receiving, from each repository agent of the plurality of repository agents, a status signal containing a status of execution of the set of one or more pre-publication actions executed by the repository agent for the library mapped to the repository agent, the status signal indicating that a name for the library mapped to the repository agent is reserved with the module repository for the repository agent; and
   each repository agent of the plurality of repository agents publishing the library mapped to the repository agent to the module repository for the repository agent under the name for the library mapped to the repository agent reserved with the module repository for the repository agent.

2. The method of claim 1, further comprising:
   displaying, for each repository agent of the plurality of repository agents, an indication in a graphical user interface that the name for the library mapped to the repository agent is reserved with the module repository for the repository agent.

3. The method of claim 1, wherein executing the set of one or more one or more pre-publication actions for the library mapped to a particular repository agent of the plurality of repository agents comprises:
   sending a request to the module repository for the particular repository agent to determine if the name for the library mapped to the particular repository agent is available in the module repository for the particular repository agent; and
   receiving a user input selecting the name for the library mapped to the particular repository agent.

4. The method of claim 1, further comprising:
   for each library of the plurality of libraries, storing the name for the library in a version store.

5. The method of claim 1, further comprising:
   each repository agent of the plurality of repository agents receiving a set of available names from the module repository for the repository agent;
   displaying, for each library of the plurality of libraries, the set of available names received by the repository agent to which the library is mapped; and
   receiving, for each library of the plurality of libraries, a user input selecting the name for the library from the set of available names received by the repository agent to which the library is mapped.

6. The method of claim 1, wherein, for each library of the plurality of libraries, the name for the library comprises a version number.

7. The method of claim 1, wherein, for each library of the plurality of libraries, the name for the library is different from the name of each other library of the plurality of libraries.

8. The method of claim 7, wherein, for each library of the plurality of libraries, the name for the library comprises one or more words in common with the name of each library of the plurality of libraries.

9. The method of claim 1, wherein each repository agent of the plurality of repository agents publishes the library mapped to the repository agent to the module repository for the repository agent under the name for the library mapped to the repository agent reserved with the module repository for the repository agent only after receiving, from each repository agent of the plurality of repository agents, the status signal containing the status of execution of the set of one or more pre-publication actions executed by the repository agent.

10. A non-transitory computer-readable media storing a set of instructions configured to perform:
   for each library of a plurality of libraries generated from a common specification, mapping the library to a repository agent of a plurality of repository agents, each repository agent of the plurality of repository agents for a module repository of a plurality of module repositories;
   each repository agent of the plurality of repository agents executing a set of one or more pre-publication actions for the library mapped to the repository agent;
   receiving, from each repository agent of the plurality of repository agents, a status signal containing a status of execution of the set of one or more pre-publication actions executed by the repository agent for the library mapped to the repository agent, the status signal indicating that a name for the library mapped to the repository agent is reserved with the module repository for the repository agent; and
   each repository agent of the plurality of repository agents publishing the library mapped to the repository agent to the module repository for the repository agent under the name for the library mapped to the repository agent reserved with the module repository for the repository agent.

11. The non-transitory computer-readable media of claim 10, wherein the set of instructions are further configured to perform:
   displaying, for each repository agent of the plurality of repository agents, an indication in a graphical user interface that the name for the library mapped to the repository agent is reserved with the module repository for the repository agent.

12. The non-transitory computer-readable media of claim 10, wherein the set of instructions are further configured to perform:
   sending a request to the module repository for a particular repository agent of the plurality of repository agents to determine if the name for the library mapped to the particular repository agent is available in the module repository for the particular repository agent; and
   receiving a user input selecting the name for the library mapped to the particular repository agent.

13. The non-transitory computer-readable media of claim 10, wherein the set of instructions are further configured to perform:
   for each library of the plurality of libraries, storing the name for the library in a version store.

14. The non-transitory computer-readable media of claim 10, wherein the set of instructions are further configured to perform:
   each repository agent of the plurality of repository agents receiving a set of available names from the module repository for the repository agent;
   displaying, for each library of the plurality of libraries, the set of available names received by the repository agent to which the library is mapped; and
   receiving, for each library of the plurality of libraries, a user input selecting the name for the library from the set of available names received by the repository agent to which the library is mapped.

15. The non-transitory computer-readable media of claim 10, wherein, for each library of the plurality of libraries, the name for the library comprises a version number.

16. A system comprising:
   a set of one or more computing devices configured to perform:
   for each library of a plurality of libraries generated from a common specification, mapping the library to a repository agent of a plurality of repository agents, each repository agent of the plurality of repository agents for a module repository of a plurality of module repositories;
   each repository agent of the plurality of repository agents executing a set of one or more pre-publication actions for the library mapped to the repository agent;
   receiving, from each repository agent of the plurality of repository agents, a status signal containing a status of execution of the set of one or more pre-publication actions executed by the repository agent for the library mapped to the repository agent, the status signal indicating that a name for the library mapped to the repository agent is reserved with the module repository for the repository agent; and
   each repository agent of the plurality of repository agents publishing the library mapped to the repository agent to the module repository for the repository agent under the name for the library mapped to the repository agent reserved with the module repository for the repository agent.

17. The system of claim 16, wherein the set of one or more computing devices are further configured to perform:
   displaying, for each repository agent of the plurality of repository agents, an indication in a graphical user interface that the name for the library mapped to the repository agent is reserved with the module repository for the repository agent.

18. The system of claim 16, wherein the set of one or more computing devices are further configured to perform:
   sending a request to the module repository for a particular repository agent of the plurality of repository agents to determine if the name for the library mapped to the particular repository agent is available in the module repository for the particular repository agent; and
   receiving a user input selecting the name for the library mapped to the particular repository agent.

19. The system of claim 16, wherein the set of one or more computing devices are further configured to perform:
   for each library of the plurality of libraries, storing the name for the library in a version store.

20. The system of claim 16, wherein the set of one or more computing devices are further configured to perform:
   each repository agent of the plurality of repository agents receiving a set of available names from the module repository for the repository agent;

displaying, for each library of the plurality of libraries, the set of available names received by the repository agent to which the library is mapped; and receiving, for each library of the plurality of libraries, a user input selecting the name for the library from the set of available names received by the repository agent to which the library is mapped.

\* \* \* \* \*